(12) United States Patent
Markus et al.

(10) Patent No.: US 12,339,902 B2
(45) Date of Patent: Jun. 24, 2025

(54) HARDWARE ACCELERATED VIDEO ENCODING

(71) Applicant: MELLANOX TECHNOLOGIES, LTD., Yokneam (IL)

(72) Inventors: Ohad Markus, Haifa (IL); Assaf Weissman, Moreshet (IL); Dotan David Levi, Kiryat Motzkin (IL); Eyal Frishman, Hod Hasharon (IL)

(73) Assignee: Mellanox Technologies, Ltd, Yokneam (IL)

( * ) Notice: Subject to any disclaimer, the term of this patent is extended or adjusted under 35 U.S.C. 154(b) by 587 days.

(21) Appl. No.: 17/493,877

(22) Filed: Oct. 5, 2021

(65) Prior Publication Data

US 2023/0107012 A1   Apr. 6, 2023

(51) Int. Cl.
*G06F 16/71* (2019.01)
*G06F 9/50* (2006.01)
*G06T 9/00* (2006.01)

(52) U.S. Cl.
CPC .......... *G06F 16/71* (2019.01); *G06F 9/5027* (2013.01); *G06T 9/00* (2013.01)

(58) Field of Classification Search
CPC .............. G06F 16/71; G06F 9/50; G06T 9/00
See application file for complete search history.

(56) References Cited

U.S. PATENT DOCUMENTS

| | | |
|---|---|---|
| 4,783,698 A | 11/1988 | Harney |
| 5,949,441 A | 9/1999 | Ristau |
| 6,075,900 A * | 6/2000 | Sakazawa ............... G06T 9/007 382/250 |
| 6,151,360 A | 11/2000 | Kato et al. |
| 7,733,464 B2 | 6/2010 | David et al. |
| 7,881,496 B2 | 2/2011 | Camilleri et al. |
| 7,936,818 B2 * | 5/2011 | Jayant .................. H04N 19/103 382/235 |
| 8,498,493 B1 | 7/2013 | Choudhary |
| 8,682,108 B2 | 3/2014 | Tian et al. |
| 8,693,551 B2 | 4/2014 | Zheludkov et al. |

(Continued)

FOREIGN PATENT DOCUMENTS

| | | |
|---|---|---|
| CN | 107113422 A | 8/2017 |
| EP | 3151560 A1 | 4/2017 |

(Continued)

OTHER PUBLICATIONS

U.S. Appl. No. 17/898,496 Office Action dated Feb. 3, 2023.

(Continued)

*Primary Examiner* — Peter D Le
(74) *Attorney, Agent, or Firm* — Meitar Patents Ltd.; Daniel Kligler

(57) ABSTRACT

In one embodiment, a system includes a hardware accelerator to receive video data of multiple video frames, divide each of the video frames into respective blocks, compute encoding assist data including at least one video encoding parameter type for each of the respective blocks of each of the video frames, and store respective portions of the encoding assist data across respective database tables, and an interface to provide the respective database tables to video encoding software running on a processor.

25 Claims, 9 Drawing Sheets

(56) References Cited

U.S. PATENT DOCUMENTS

| | | | |
|---|---|---|---|
| 8,737,469 B1* | 5/2014 | Huang | H04N 19/48 375/240.12 |
| 9,131,235 B2 | 9/2015 | Zheludkov et al. | |
| 9,270,299 B2 | 2/2016 | Uby et al. | |
| 9,367,746 B2 | 6/2016 | Ishihara | |
| 9,451,266 B2 | 9/2016 | Zheludkov et al. | |
| 9,767,529 B1 | 9/2017 | Liu et al. | |
| 10,136,131 B2 | 11/2018 | Zheludkov | |
| 10,200,719 B2 | 2/2019 | Zhang et al. | |
| 10,516,710 B2 | 12/2019 | Levi et al. | |
| 2002/0015446 A1* | 2/2002 | Miyaji | H04N 19/152 375/E7.157 |
| 2002/0041089 A1 | 4/2002 | Yasui | |
| 2003/0152148 A1* | 8/2003 | Laksono | H04N 21/440263 375/E7.18 |
| 2004/0146203 A1 | 7/2004 | Yoshimura et al. | |
| 2004/0165091 A1 | 8/2004 | Takemura et al. | |
| 2005/0220353 A1 | 10/2005 | Karczewicz et al. | |
| 2005/0276323 A1* | 12/2005 | Martemyanov | H04N 19/159 375/E7.262 |
| 2006/0017843 A1 | 1/2006 | Shi et al. | |
| 2006/0129909 A1 | 6/2006 | Butt et al. | |
| 2006/0180670 A1 | 8/2006 | Acosta et al. | |
| 2006/0256851 A1 | 11/2006 | Wang et al. | |
| 2007/0110160 A1 | 5/2007 | Wang et al. | |
| 2007/0140591 A1* | 6/2007 | Kurata | H04N 23/683 348/E5.046 |
| 2007/0147496 A1* | 6/2007 | Sherigar | H04N 19/44 375/240.03 |
| 2007/0153008 A1* | 7/2007 | Song | G06F 9/3802 375/E7.1 |
| 2007/0211157 A1 | 9/2007 | Humpoletz et al. | |
| 2007/0296849 A1 | 12/2007 | Sano et al. | |
| 2008/0043842 A1* | 2/2008 | Nakaishi | H04N 19/137 375/E7.262 |
| 2008/0043845 A1* | 2/2008 | Nakaishi | H04N 19/433 375/E7.181 |
| 2008/0084491 A1 | 4/2008 | He et al. | |
| 2008/0095240 A1 | 4/2008 | Choi et al. | |
| 2008/0126278 A1 | 5/2008 | Bronstein et al. | |
| 2009/0021612 A1 | 1/2009 | Hamilton, Jr. et al. | |
| 2009/0153699 A1 | 6/2009 | Satoh et al. | |
| 2009/0180539 A1 | 7/2009 | Kudana et al. | |
| 2009/0244288 A1 | 10/2009 | Fujimoto et al. | |
| 2009/0323810 A1* | 12/2009 | Liu | H04N 19/137 375/E7.125 |
| 2010/0002770 A1 | 1/2010 | Motta et al. | |
| 2010/0034270 A1* | 2/2010 | Nagaraj | H04N 19/44 375/E7.104 |
| 2010/0086049 A1* | 4/2010 | Ye | H04N 19/61 375/E7.123 |
| 2010/0149393 A1 | 6/2010 | Zarnowski et al. | |
| 2010/0226438 A1 | 9/2010 | Saunders et al. | |
| 2010/0265316 A1 | 10/2010 | Sali et al. | |
| 2010/0278269 A1 | 11/2010 | Andersson et al. | |
| 2011/0268194 A1 | 11/2011 | Nagano | |
| 2012/0020413 A1 | 1/2012 | Chen et al. | |
| 2012/0033039 A1 | 2/2012 | Sasaki et al. | |
| 2012/0044990 A1 | 2/2012 | Bivolarsky et al. | |
| 2012/0147975 A1 | 6/2012 | Ju | |
| 2012/0281924 A1 | 11/2012 | Coulombe et al. | |
| 2013/0077690 A1* | 3/2013 | Wei | H04N 19/42 375/E7.123 |
| 2013/0101039 A1 | 4/2013 | Florencio | |
| 2013/0163674 A1 | 6/2013 | Zhang | |
| 2013/0208795 A1 | 8/2013 | Xu et al. | |
| 2013/0265388 A1 | 10/2013 | Zhang et al. | |
| 2013/0301727 A1 | 11/2013 | Huang et al. | |
| 2013/0301732 A1 | 11/2013 | Hsu et al. | |
| 2013/0322753 A1 | 12/2013 | Lim et al. | |
| 2013/0329006 A1 | 12/2013 | Boles et al. | |
| 2014/0161188 A1 | 6/2014 | Zhang et al. | |
| 2014/0177726 A1 | 6/2014 | Okajima | |
| 2014/0185688 A1* | 7/2014 | Kimura | H04N 19/186 375/240.18 |
| 2015/0237356 A1 | 8/2015 | Wu et al. | |
| 2015/0312588 A1* | 10/2015 | Yamamoto | H04N 19/463 375/240.15 |
| 2016/0100186 A1 | 4/2016 | Gisquet et al. | |
| 2016/0191946 A1 | 6/2016 | Zhou et al. | |
| 2016/0286232 A1 | 9/2016 | Li et al. | |
| 2016/0345018 A1 | 11/2016 | Sadhwani et al. | |
| 2017/0006294 A1 | 1/2017 | Huang et al. | |
| 2017/0134732 A1 | 5/2017 | Chen | |
| 2017/0332099 A1 | 11/2017 | Lee et al. | |
| 2018/0098070 A1 | 4/2018 | Chuang et al. | |
| 2018/0124418 A1 | 5/2018 | Van Leuven et al. | |
| 2018/0152699 A1 | 5/2018 | Kumar et al. | |
| 2018/0302640 A1 | 10/2018 | Li et al. | |
| 2018/0316929 A1 | 11/2018 | Li et al. | |
| 2018/0343448 A1 | 11/2018 | Possos et al. | |
| 2018/0359483 A1 | 12/2018 | Chen et al. | |
| 2018/0376160 A1 | 12/2018 | Zhang et al. | |
| 2019/0037227 A1 | 1/2019 | Holland et al. | |
| 2019/0058882 A1 | 2/2019 | Hinz et al. | |
| 2019/0110058 A1 | 4/2019 | Chien et al. | |
| 2019/0141318 A1 | 5/2019 | Li et al. | |
| 2019/0158882 A1 | 5/2019 | Chen et al. | |
| 2019/0188829 A1 | 6/2019 | Wei | |
| 2019/0200044 A1 | 6/2019 | Galpin et al. | |
| 2019/0230376 A1 | 7/2019 | Hu et al. | |
| 2019/0327484 A1 | 10/2019 | Grange et al. | |
| 2020/0014918 A1 | 1/2020 | Levi et al. | |
| 2020/0014945 A1 | 1/2020 | Levi et al. | |
| 2020/0077116 A1 | 3/2020 | Lee et al. | |
| 2020/0098132 A1* | 3/2020 | Kim | H04N 19/91 |
| 2020/0245016 A1 | 7/2020 | Levi et al. | |
| 2021/0168354 A1 | 6/2021 | Levi et al. | |
| 2021/0250605 A1 | 8/2021 | Lee | |
| 2022/0095007 A1 | 3/2022 | Levi et al. | |

FOREIGN PATENT DOCUMENTS

| | | |
|---|---|---|
| GB | 2547754 A | 8/2017 |
| JP | 4824687 B2 | 11/2011 |

OTHER PUBLICATIONS

U.S. Appl. No. 16/442,581 Office Action dated May 3, 2022.
U.S. Appl. No. 16/291,023 Office Action dated May 27, 2022.
U.S. Appl. No. 17/095,765 Office Action dated Jun. 9, 2022.
De Rivaz et al., "AV1 Bitstream & Decoding Process Specification", pp. 1-681, Jan. 8, 2019.
Grange et al., "A VP9 Bitstream Overview draft-grange-vp9-bitstream-00", Network Working Group, pp. 1-14, Feb. 18, 2013.
ITU-T Recommendation H.264., "Series H: Audiovisual and Multimedia Systems: Infrastructure of audiovisual services—Coding of moving video; Advanced video coding for generic audiovisual services", pp. 1-282, May 2003.
ITU-T Recommendation H.265., "Series H: Audiovisual and Multimedia Systems: Infrastructure of audiovisual services—Coding of moving video; High efficiency video coding", pp. 1-634, Apr. 2015.
Wikipedia., 'Versatile Video Coding', pp. 1-5, Feb. 22, 2019 (https://en.wikipedia.org/w/index.php?title=Versatile_Video_Coding&oldid=884627637).
Mellanox Technologies, "ConnectX®-5 EN Card," Adapter Card Product Brief, pp. 1-4, year 2020.
"MainConcept Accelerates HEVC Encoding with NVIDIA RTX GPUs," news article, MainConcept GmbH newsletter, pp. 1-4, Apr. 8, 2019, downloaded from https://www.mainconcept.com/company/news/news-article/article/mainconcept-accelerates-hevc-encoding-with-nvidia-rtx-gpus.html.
Sjoberg et al., "RTP Payload Format and File Storage Format for the Adaptive Multi-Rate (AMR) and Adaptive Multi-Rate Wideband (AMR-WB) Audio Codecs," Network Working Group, Request for Comments 4867, pp. 1-59, Apr. 2007.
Gharai et al., "RTP Payload Format for Uncompressed Video", RFC 4175, Internet Engineering Task Force, Internet-Draft, pp. 1-14, Nov. 3, 2002.

(56) References Cited

OTHER PUBLICATIONS

SMPTE Standard 2022-6:2012—"Transport of High Bit Rate Media Signals over IP Networks (HBRMT)", The Society of Motion Picture and Television Engineers, pp. 1-16, Oct. 9, 2012.
U.S. Appl. No. 17/095,765 Office Action dated Dec. 6, 2021.
CN Application # 2019106022492 Office Action dated Aug. 3, 2022.
U.S. Appl. No. 17/095,765 Office Action dated Sep. 22, 2022.
U.S. Appl. No. 16/291,023 Office Action dated Sep. 30, 2022.
U.S. Appl. No. 17/542,426 Office Action dated Nov. 4, 2022.
U.S. Appl. No. 17/095,765 Office Action dated Jan. 18, 2023.
U.S. Appl. No. 16/291,023 Office Action dated Jan. 28, 2022.
U.S. Appl. No. 17/095,765 Office Action dated Mar. 17, 2022.

\* cited by examiner

Fig. 8
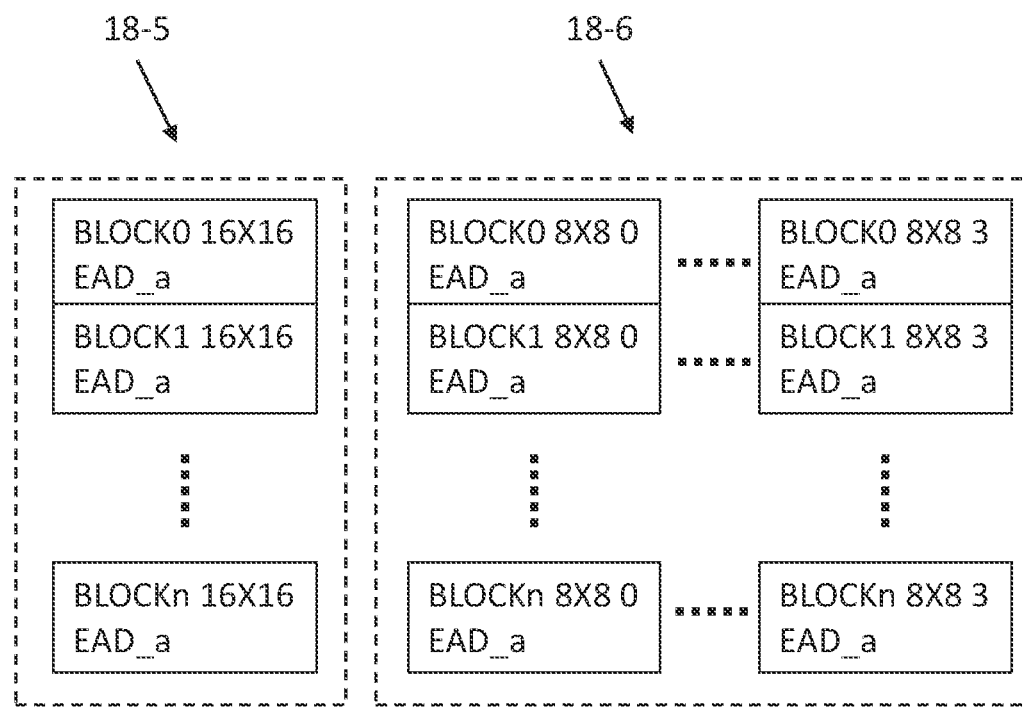
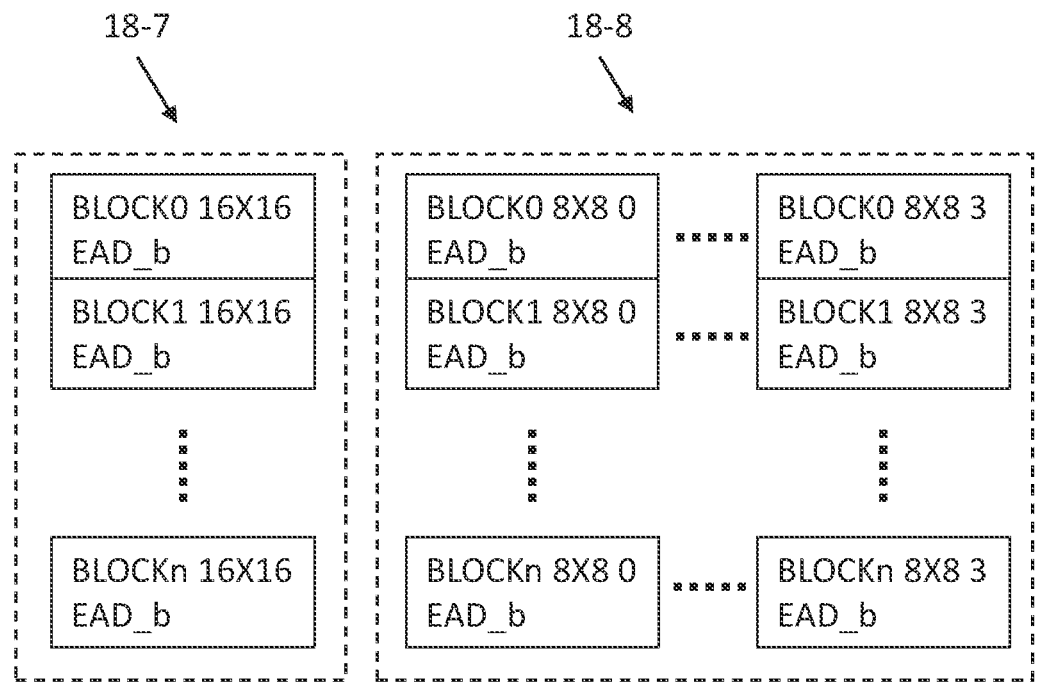

HARDWARE ACCELERATED VIDEO ENCODING

FIELD OF THE INVENTION

The present invention relates to video encoding, and in particular, but not exclusively to, hybrid hardware and software video encoding.

BACKGROUND

The ability to process video streams quickly and efficiently has grown in importance, with portable consumer electronic products incorporating more and more multimedia features. Mobile phones, for example, can be used to retrieve, view and transmit multimedia content. However, while the capabilities of portable devices continue to increase, such devices are still somewhat limited relative to more powerful platforms such as personal computers. Data transmission and retrieval rates may also be a factor. The amount of image (e.g., video) data is usually more of a consideration than the amount of audio data.

The data is often compressed to facilitate storage and streaming, and then decompressed for playback (e.g., display). Video data may be compressed using a Moving Pictures Experts Group (MPEG) scheme, for example. By encoding a video sequence, the number of bits needed to represent the video sequence can be greatly reduced.

In a typical video sequence, the content of one frame, or at least a portion of that frame, may be very similar to that of another frame. This is commonly referred to as "temporal redundancy." A compression technique commonly referred to as "motion compensation" is employed to exploit temporal redundancy. If content in a frame is closely related to that of another (reference) frame, it is possible to accurately represent, or predict, the content of the frame using the reference frame.

The frames are partitioned into blocks of pixels (e.g., a macroblock of 16×16 pixels). The movement of a block that, apart from being moved to a different position, is not otherwise transformed significantly from a corresponding block in the reference frame, can be represented using a motion vector. For example, a motion vector of (3,4) can mean that the block has moved three pixels to the left and four pixels upward relative to the position of its corresponding block in the reference frame. Motion compensation refers to the application of a motion vector to a decompressed block to construct a new block (or frame or image).

Compression standards continue to evolve, in order to achieve higher compression rates without compromising the quality of the reconstructed video. Known standards include, but are not limited to: AVC; VP9; HEVC; AV1; and VVC.

SUMMARY

There is provided in accordance with an embodiment of the present disclosure, a system including a hardware accelerator to receive video data of multiple video frames, divide each of the video frames into respective blocks, compute encoding assist data including at least one video encoding parameter type for each of the respective blocks of each of the video frames, and store respective portions of the encoding assist data across respective database tables, and an interface to provide the respective database tables to video encoding software running on a processor.

Further in accordance with an embodiment of the present disclosure the at least one video encoding parameter type includes any one or more of the following a motion vector, a measure of block matching, a motion vector cost, a rate distortion optimization score, an intra prediction cost, an intra prediction direction, a block distance metric, or a weighted cost score.

Still further in accordance with an embodiment of the present disclosure the hardware accelerator is configured to store the respective portions of the encoding assist data across the respective database tables responsively to respective video encoding parameter types.

Additionally in accordance with an embodiment of the present disclosure the hardware accelerator is configured to store the respective portions of the encoding assist data across the respective database tables responsively to respective block sizes.

Moreover, in accordance with an embodiment of the present disclosure the hardware accelerator is configured to store the respective portions of the encoding assist data across the respective database tables responsively to respective video encoding parameter types and respective block sizes.

Further in accordance with an embodiment of the present disclosure the hardware accelerator is configured to scan the video frames responsively to a recursive z-shaped scan pattern, and store the encoding assist data ordered in the respective database tables responsively to the recursive z-shaped scan pattern.

Still further in accordance with an embodiment of the present disclosure the recursive z-shaped scan pattern is a nested z-shaped scan pattern.

Additionally in accordance with an embodiment of the present disclosure, the system includes the processor to run the encoding software, which is configured to load a first table of the respective database tables into memory and perform a first part of an encoding process responsively to data of the loaded first table, load a second table of the respective database tables into memory and perform a second part of the encoding process responsively to data of the loaded second table, and compress the video data into encoded video frames responsively to the encoding assist data included in the respective database tables.

Moreover, in accordance with an embodiment of the present disclosure the first table includes respective video encoding parameters of a first video encoding parameter type for selected blocks of the respective blocks of at least one of the video frames, and the second table includes respective video encoding parameters of a second video encoding parameter type, different to the first video encoding parameter type, for the selected blocks.

Further in accordance with an embodiment of the present disclosure the first video encoding parameter type of the first table is a motion vector, and the first part of the encoding process includes performing rate control responsively to motion vectors in the first table.

Still further in accordance with an embodiment of the present disclosure the second video encoding parameter type of the second table is a measure of block matching, and the second part of the encoding process includes identifying a scene cut responsively to measures of block matching in the second table.

Additionally in accordance with an embodiment of the present disclosure the encoding software is configured to load a third table of the respective database tables into memory and perform a third part of an encoding process responsively to data of the loaded third table, the encoding software is configured to load a fourth table of the respective database tables into memory and perform a fourth part of the encoding process responsively to data of the loaded fourth table, the first table includes respective video encoding parameters of a first video encoding parameter type for first selected blocks of the respective blocks of at least one of the video frames of a first block size, the second table includes respective video encoding parameters of a second video encoding parameter type, different to the first video encoding parameter type, for the first selected blocks of the first block size, the third table includes respective video encoding parameters of the first video encoding parameter type for second selected blocks of the respective blocks of the at least one of the video frames of a second block size, different to the first block size, and the fourth table includes respective video encoding parameters of the second video encoding parameter type for the second selected blocks of the second block size.

Moreover, in accordance with an embodiment of the present disclosure the first table includes first selected blocks of the respective blocks of at least one of the video frames of a first block size, and the second table includes second selected blocks of the respective blocks of the at least one of the video frames of a second block size, different to the first block size.

Further in accordance with an embodiment of the present disclosure the first block size is larger than the second block size, and the encoding software is configured to load the first table and analyze data of the first selected blocks of the first block size, and then load the second table and analyze data of the second selected blocks of the second block size.

There is also provided in accordance with another embodiment of the present disclosure, a method including receiving video data of multiple video frames, dividing each of the video frames into respective blocks, computing encoding assist data including at least one video encoding parameter type for each of the respective blocks of each of the video frames, storing respective portions of the encoding assist data across respective database tables, and providing the respective database tables to video encoding software.

Still further in accordance with an embodiment of the present disclosure the at least one video encoding parameter type is selected from any one or more of the following a motion vector, a rate distortion optimization score, an intra prediction cost, an intra prediction direction, a block distance metric, or a weighted cost score.

Additionally in accordance with an embodiment of the present disclosure the storing includes storing the respective portions of the encoding assist data across the respective database tables responsively to respective video encoding parameter types.

Moreover, in accordance with an embodiment of the present disclosure the storing includes storing the respective portions of the encoding assist data across the respective database tables responsively to respective block sizes.

Further in accordance with an embodiment of the present disclosure the storing includes storing the respective portions of the encoding assist data across the respective database tables responsively to respective video encoding parameter types and respective block sizes.

Still further in accordance with an embodiment of the present disclosure, the method includes loading a first table of the respective database tables into memory and performing a first part of an encoding process responsively to data of the loaded first table, loading a second table of the respective database tables into memory and performing a second part of the encoding process responsively to data of the loaded second table, and compressing the video data into encoded video frames responsively to the encoding assist data included in the respective database tables.

Additionally in accordance with an embodiment of the present disclosure the first table includes respective video encoding parameters of a first video encoding parameter type for selected blocks of the respective blocks of at least one of the video frames, and the second table includes respective video encoding parameters of a second video encoding parameter type, different to the first video encoding parameter type, for the selected blocks.

Moreover in accordance with an embodiment of the present disclosure, the method includes loading a third table of the respective database tables into memory and performing a third part of an encoding process responsively to data of the loaded third table, loading a fourth table of the respective database tables into memory and performing a fourth part of the encoding process responsively to data of the loaded fourth table, and wherein the first table includes respective video encoding parameters of a first video encoding parameter type for first selected blocks of the respective blocks of at least one of the video frames of a first block size, the second table includes respective video encoding parameters of a second video encoding parameter type, different to the first video encoding parameter type, for the first selected blocks of the first block size, the third table includes respective video encoding parameters of the first video encoding parameter type for second selected blocks of the respective blocks of the at least one of the video frames of a second block size, different to the first block size, and the fourth table includes respective video encoding parameters of the second video encoding parameter type for the second selected blocks of the second block size.

Further in accordance with an embodiment of the present disclosure the first table includes first selected blocks of the respective blocks of at least one of the video frames of a first block size, and the second table includes second selected blocks of the respective blocks of the at least one of the video frames of a second block size, different to the first block size.

Still further in accordance with an embodiment of the present disclosure the first block size is larger than the second block size, the method further including loading the first table and analyzing data of the first selected blocks of the first block size, and then loading the second table and analyzing data of the second selected blocks of the second block size.

Additionally in accordance with an embodiment of the present disclosure, the method includes scanning the video frames responsively to a recursive z-shaped scan pattern, and storing the encoding assist data ordered in the respective database tables responsively to the recursive z-shaped scan pattern.

Moreover, in accordance with an embodiment of the present disclosure the recursive z-shaped scan pattern is a nested z-shaped scan pattern.

BRIEF DESCRIPTION OF THE DRAWINGS

The present invention will be understood from the following detailed description, taken in conjunction with the drawings in which:

FIG. 8 is a schematic view of different database tables for data of different block sizes and different video encoding parameter types for use in the system of FIG. 1;

DESCRIPTION OF EXAMPLE EMBODIMENTS

Overview

Figure 1:
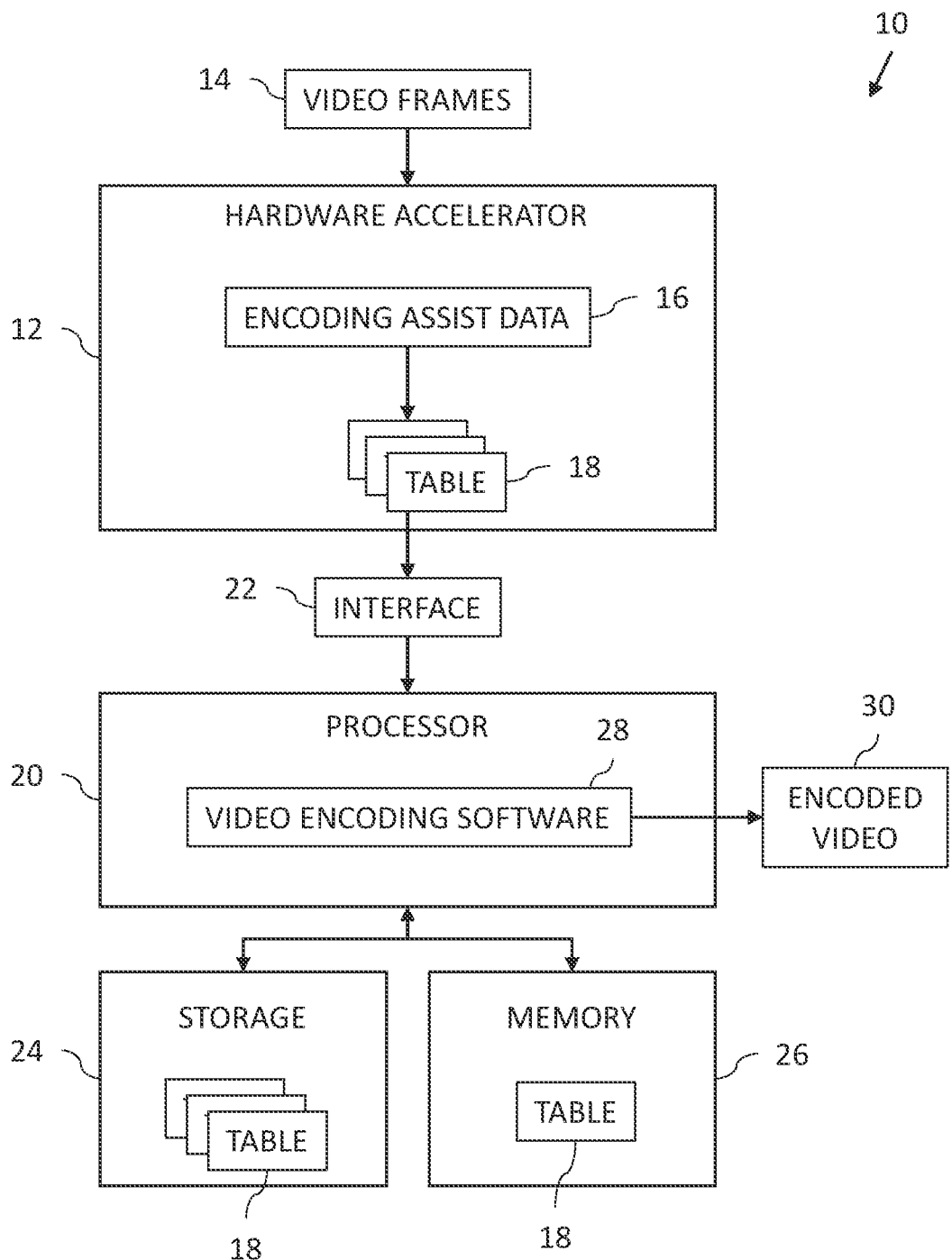
FIG. 1 is a block diagram view of a hybrid hardware-software encoding system constructed and operative in accordance with an embodiment of the present invention.

Video encoders are typically implemented in software and incorporate various algorithms to compress video effectively. Software provides flexibility in the encoding process but is not as quick as hardware processing.

One solution to provide quicker encoding while allowing the flexibility of software is to divide the encoding process between hardware and software. Hardware may receive raw video data and perform many computations in hardware yielding video encoding parameters for use by software which then analyses the computed video encoding parameters and completes the encoding process. One such solution is described in U.S. patent application Ser. No. 17/095,765 (hereinafter '765) of Levi, et al, and entitled "Video Coding System", filed Nov. 12, 2020, and is hereby incorporated by reference herein. The '765 patent application describes a video coding system including an acceleration device including input circuitry configured, for each of a first plurality of video frames to be encoded, to receive an input including at least one raw video frame and at least one reference frame, and to divide each of the first plurality of video frames to be encoded into a second plurality of blocks, and similarity computation circuitry configured, for each one of the first plurality of video frame to be encoded: for each the block of the second plurality of blocks, to produce an intra-prediction hint and an intra-prediction direction. Aspects of the '765 are described herein in the Annex at the end of the system description section.

The volume of video encoding parameters provided by the hardware to the software affects the speed of the software process, which is slowed down by the data retrieval operations involved when retrieving the video encoding parameters provided by the hardware thereby partially setting off the advantage provided by the hardware processing.

Another problem is that when new video encoding parameters and/or block sizes need to be added to the process, both the hardware and software may need to be amended in a non-trivial manner (e.g., updating the interface between the hardware and the software) to accommodate transfer and processing of the new encoding parameters and/or block sizes.

Therefore, embodiments of the present invention solve the above problems by providing a hardware accelerator, which receives video data of multiple video frames, divides each of the frames into blocks, computes encoding assist data (EAD) (which includes video encoding parameters) for each of the blocks, and stores the EAD across multiple database tables so that one part of the EAD is stored in one table, and another part of the EAD in stored in one or more other tables etc. The tables are then provided to video encoding software. In this manner, when the encoding software retrieves the EAD, the EAD may be retrieved in smaller sections which are more relevant to corresponding current encoding tasks.

The term "encoding assist data", as used in the specification and claims, is defined to include data derived from video data of one or more video frames and used by the video encoding software as part of the video compression process. EAD may include video encoding parameters (e.g., video encoding decisions, video encoding suggestions, quality metrics for one or more of the video encoding decisions and/or suggestions), and video image data derived from the video frame(s).

For example, table 1 may be loaded into memory, and the EAD included in table 1 may then analyzed. Then table 2 may be loaded into memory, and the EAD included in table 2 may then analyzed, and so on. In this way, smaller chunks of more relevant data may be loaded and analyzed when needed, making the data retrieval process more efficient.

In some embodiments, the EAD may be apportioned across the tables responsively to video encoding parameter type and/or block size. The video encoding parameter types may include any suitable video encoding parameter type, for example: a motion vector; a measure of block matching; a motion vector cost; a rate distortion optimization (RDO) score; an intra prediction cost; an intra prediction direction; a block distance metric; and/or a weighted cost score. The video encoding parameters are described in more detail below.

By way of example, table 1 may include video encoding parameters for blocks with a size 16×16 pixels, whereas table 2 may include video encoding parameters for blocks with a size 8×8 pixels. The video encoding software may then load table 1 to analyze the EAD for 16×16 blocks, and if needed at a later stage load table 2 to analyze the EAD for 8×8 blocks. In some cases, the video encoding software may not need to load table 2. In this manner, the relevant data is loaded and analyzed from the same table thereby reducing data retrieval operations. Similarly, if a new block size is added to the encoding process, then a new table may be added for the new block size without having to change (or significantly change) the existing table format and the data interface between the hardware and the software.

By way of another example, table 1 may include motion vector values, whereas table 2 may include measures of block matching. The video encoding software may then load table 1 to analyze the motion vectors, for example to perform rate control, and if needed at a later stage, load table 2 to analyze the measures of block matching, for example, to identify a scene cut. In this manner, the relevant data is loaded for the relevant encoding tasks and analyzed from the same table thereby reducing data retrieval operations. Similarly, if a new video encoding parameter is added to the general encoding process, then a new table may be added for the new video encoding parameter without having to change (or significantly change) the table format and the data interface between the hardware and the software.

In some embodiments, there may be different tables for different combinations of video encoding parameter type and block size. For example, table 1 may include motion vectors for block size 16×16, table 2 may include motion vectors for block size 8×8, table 3 may include measures of block matching for block size 16×16, and table 4 may include measures of block matching for block size 8×8, and so on.

In some embodiments, the hardware accelerator scans the video frames responsively to a recursive z-shaped scan pattern (e.g., a nested z-shaped scan pattern), which allows less and more relevant data to be stored in memory at any one time, as the z-shape scan pattern allows scanning of blocks (e.g., four 8×8 blocks) which also make up a larger block (one 16×16 block), and so on. The scan order of the z-shape scan pattern is also useful for the video encoding software which may also process block data in accordance with the z-shaped scan pattern. Therefore, in some embodiments, the hardware accelerator stores the EAD ordered in the respective database tables responsively to the order of the recursive z-shaped scan pattern.

The video encoding parameter types mentioned above are now described in more detail.

A motion vector is a two-dimensional vector used for prediction that provides an offset from the coordinates of the candidate block to the coordinates in a reference image. A motion vector cost provides a cost score of encoding a given motion vector for the candidate block. A measure of block matching provides a measure of how well the candidate block matches the reference image or reference block or region in the reference image. A weighted cost score provides a measure of how much it will cost to encode the motion vector plus the measure of block matching. A block distance metric is a video encoding parameter which provides a measure of distance between the candidate block to a reference block in the reference image. Intra prediction cost and direction are discussed in more detail in the Annex.

A rate distortion optimization score provides a score for a rate and distortion pair for a block being evaluated. When performing motion estimation, or trying to find the best block in a reference image against which to compensate, performing a transform to each candidate block in order to estimate a rate distortion optimization score (RDO score) of that candidate block, is extremely compute intensive, and may in fact be practically impossible. The following formula is believed to be a good estimation of the energy residing in AC coefficients (a term used interchangeably herein with "AC elements"):

Given a Target block T and a candidate reference block C, the energy of AC coefficients a residual block R that will be created when compensating Block T from block C is:

$$AC \text{ in } R \sim SAD(T,C) - |AVG(T) - AVG(C)|$$

where:
SAD represents Sum of Absolute Difference, as described above;
AVG represents the average of pixel values in a given block;
~ represents approximation; and
| | represents absolute value.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. An encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. Encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

A "reference frame" or "reference image", as used in the specification and claims, is defined as follows. If the decoding of a first video frame is at least partially dependent on video data of a second, now decompressed, video frame, then the second video frame is a reference frame of the first video frame. In older video encoding standards, such as MPEG-2, only one reference frame was used for P-frames and two reference frames were used for B-frames. Some modern video encoding standards, such as H.264/AVC, allow the use of multiple reference frames. This allows the video encoder to choose among more than one previously decoded frame on which to base each macroblock in the next frame. While the best frame for this purpose is usually the previous frame, the extra reference frames can improve compression efficiency and/or video quality. Note that different reference frames can be chosen for different macroblocks in the same frame. The maximum number of concurrent reference frames supported by H.264 is 16 per list. Different reference frames can be chosen for a macroblock. Another video format that supports multiple reference frames is Snow, which can handle up to eight. The Theora codec provides a limited form of multiple reference frames, allowing references to both the preceding frame and the most recent intra frame.

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Reference is now made to FIG. 1, which is a block diagram view of a hybrid hardware-software encoding system 10 constructed and operative in accordance with an embodiment of the present invention. The hybrid hardware-software encoding system 10 includes a hardware accelerator 12 configured to receive video frames 14, compute encoding assist data 16 (e.g., including video encoding parameters of one or more video encoding parameter types), and store the encoding assist data 16 across multiple database tables 18. Each database table 18 may include encoding assist data 16 for one of the video frames 14, more than one of the video frames 14, or less than one of the video frames 14. The video encoding parameter types included in the encoding assist data 16 may include any one or more of the following: a motion vector; a measure of block matching; a motion vector cost; a rate distortion optimization score; an intra prediction cost; an intra prediction direction; a block distance metric; or a weighted cost score. In practice, some or all of the functions of the hardware accelerator 12 may be combined in a single physical component or, alternatively, implemented using multiple physical components. These physical components may comprise hard-wired devices.

The hybrid hardware-software encoding system 10 also includes an interface 22, a processor 20, a storage device 24, and a memory 26. The interface 22 is configured to transfer the database tables 18 from the hardware accelerator 12 to the processor 20. The processor 20 is configured to store the database tables 18 in the storage device 24. The processor 20 is configured to selectively load one or more of the database tables 18 at a time into the memory 26, which is a working memory of the processor 20, and includes buffers with lines to store all or part of one or more of the database tables 18 at any one time. The processor 20 is configured to run video encoding software 28 to encode the video frames 14 yielding encoded video 30, responsively to the encoding assist data 16. The video encoding software 28 performs various decisions about what information of the encoding assist data 16 to encode and how to encode it based on one or more of the video encoding parameters included in the encoding assist data 16. For example, sometimes 16×16 blocks may be used for encoding, and other times 8×8 blocks may be used. Sometimes motion vectors may be encoded, other times not.

In practice, some or all of the functions of the processor 20 may be combined in a single physical component or, alternatively, implemented using multiple physical components. These physical components may comprise hard-wired or programmable devices, or a combination of the two. In some embodiments, at least some of the functions of the processor 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
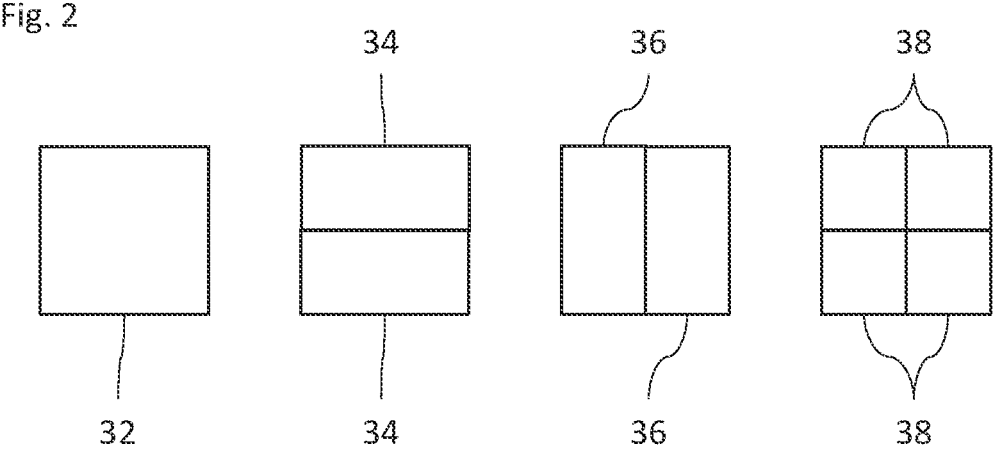
FIG. 2 is a schematic view of various example block sizes for use in the system of FIG. 1.

Reference is now made to FIG. 2, which is a schematic view of various example block sizes for use in the system 10 of FIG. 1. FIG. 2 shows blocks of various block sizes, for example, a 16×16 pixel block 32, two 16×8 pixel blocks 34, two 8×16 pixel blocks 36, and four 8×8 pixel blocks 38. The hardware accelerator 12 may split the video frames 14 into blocks of any size and/or shape. For example, the hardware accelerator 12 may split one of the video frames 14 into the 16×16 blocks 32, and the 8×8 blocks 38. The abovementioned block sizes are given by way of example. In some embodiments, larger or smaller, and/or different shape (e.g., other non-square) block sizes may be used. Each of the blocks may then be compared to other blocks (typically in a reference image) to compute the various video encoding parameters.

Figure 3:
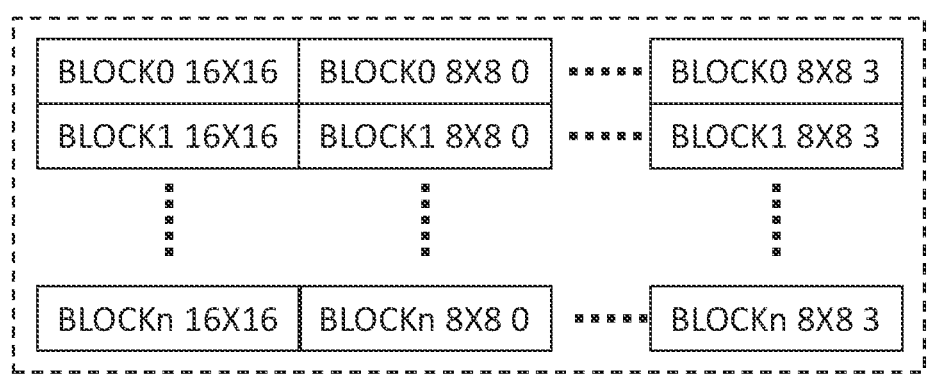
FIG. 3 is a schematic view of a single database table including data of multiple block sizes.

Reference is now made to FIG. 3, which is a schematic view of a single database table 40 including data of multiple block sizes. The database table 40 includes various computed video encoding parameters for various block sizes (16×16 and 8×8). The label "BLOCK0 16×16" refers to encoding assist data 16 for block 0 of the 16×16 block size, and so on. The label "BLOCK0 8×8 0" refers to encoding assist data 16 for block 0 sub-block 0 of the 8×8 block size, and the label "BLOCK0 8×8 1" refers to encoding assist data 16 for block 0 sub-block 1 of the 8×8 block size, and so on.

If the database table 40 was to be generated by the hybrid hardware-software encoding system 10, and the video encoding software 28 only needs the encoding assist data 16 for one video encoding parameter type and/or one block size, unnecessary data may need to be loaded from the database table 40 into memory 26, and more memory retrieval operations may be needed to extract the encoding assist data 16 to perform encoding tasks. Additionally, if more block sizes and/or more video encoding parameter types are added to the hybrid hardware-software encoding system 10, the database table 40, the processes used to generate the database table 40, and transfer the database table 40 from the hardware accelerator 12 to the video encoding software 28 might need updating in a significant way.

Figure 4:
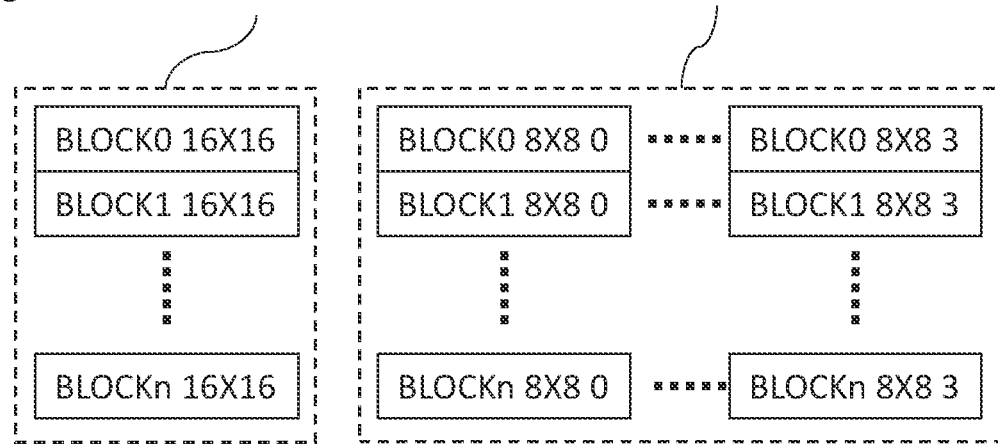
FIG. 4 is a schematic view of different database tables for data of different block sizes for use in the system of FIG. 1.

Reference is now made to FIG. 4, which is a schematic view of different database tables 18-1, 18-2 for data of different block sizes (16×16 blocks, and 8×8 blocks) for use in the system 10 of FIG. 1. Table 18-1 includes encoding assist data 16 for 16×16 blocks, while table 18-2 includes encoding assist data 16 for 8×8 blocks. In this manner, if the video encoding software 28 needs to process encoding assist data 16 for 16×16 blocks then table 18-1 is loaded into memory 26, while if the video encoding software 28 needs to process encoding assist data 16 for 8×8 blocks then table 18-2 is loaded into memory 26, thereby improving data retrieval processes. In this manner, if a new block size is added to the hybrid hardware-software encoding system 10, a new table for the new block size may be generated and any changes to the hardware accelerator 12 and/or the video encoding software 28 are minimized.

Figure 5:
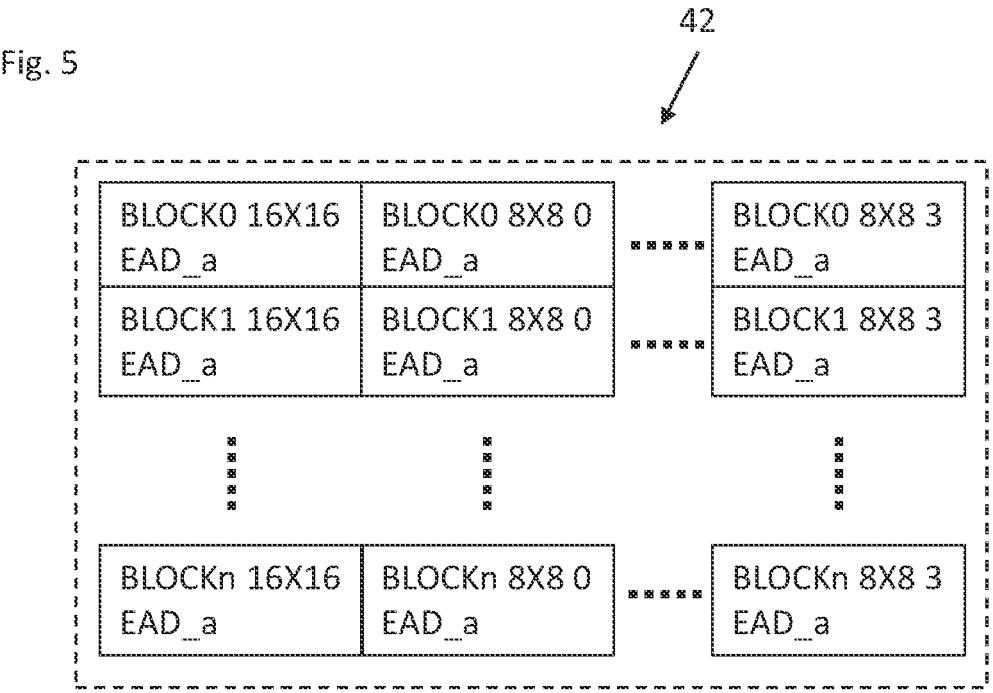
FIG. 5 is a schematic view of a single database table including data of multiple block sizes and one video encoding parameter type.
Figure 6:
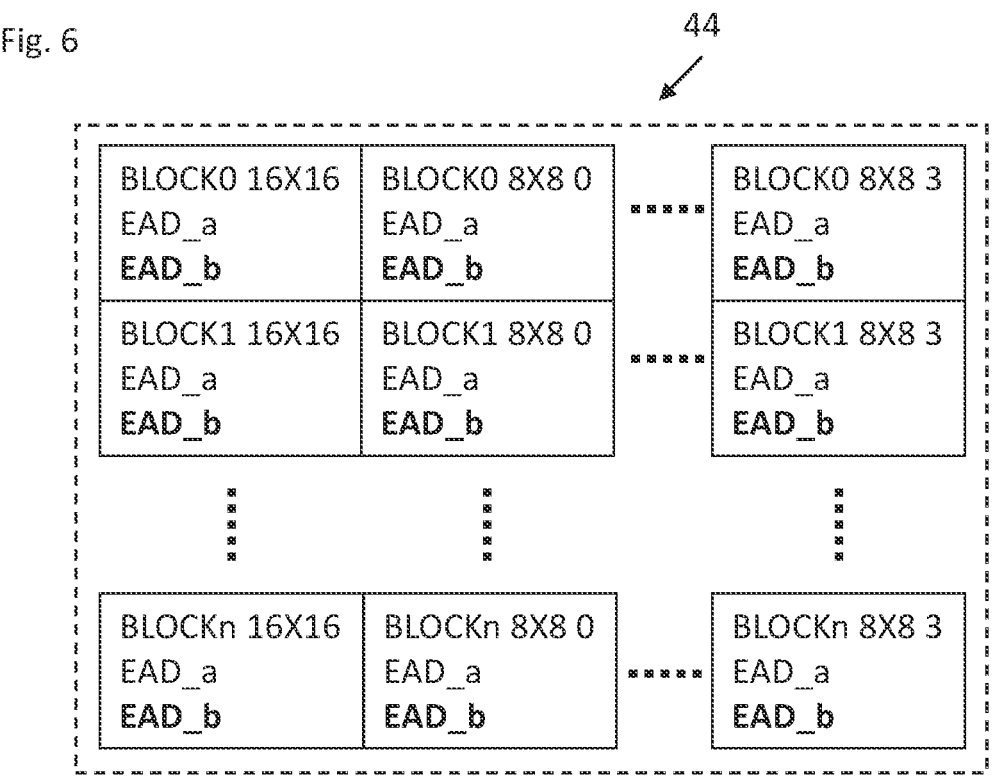
FIG. 6 is a schematic view of a single database table including data of multiple block sizes and two video encoding parameter types.

Reference is now made to FIGS. 5 and 6. FIG. 5 is a schematic view of a single database table 42 including data of multiple block sizes and one video encoding parameter type (EAD_a). FIG. 6 is a schematic view of a single database table 44 including data of multiple block sizes and two video encoding parameter types (EAD_a, and EAD_b). FIGS. 5 and 6 illustrate the problem of having to add a video encoding parameter type to the hybrid hardware-software encoding system 10 while using a single database table to hold all the encoding assist data 16. Adding EAD_b to the single database table 42 to yield database table 44 may necessitate, in addition to updating the data structure of the single database table 42, updating the processes used to generate the database table 44 and transfer the database table 44 from the hardware accelerator 12 to the video encoding software 28. Additionally, if the database table 44 was to be generated by the hybrid hardware-software encoding system 10, and the video encoding software 28 only needs the encoding assist data 16 for one video encoding parameter type and/or one block size, unnecessary data may need to be loaded from the database table 44 into memory 26, and more memory retrieval operations may be needed to extract the encoding assist data 16 to perform encoding tasks.

Figure 7:
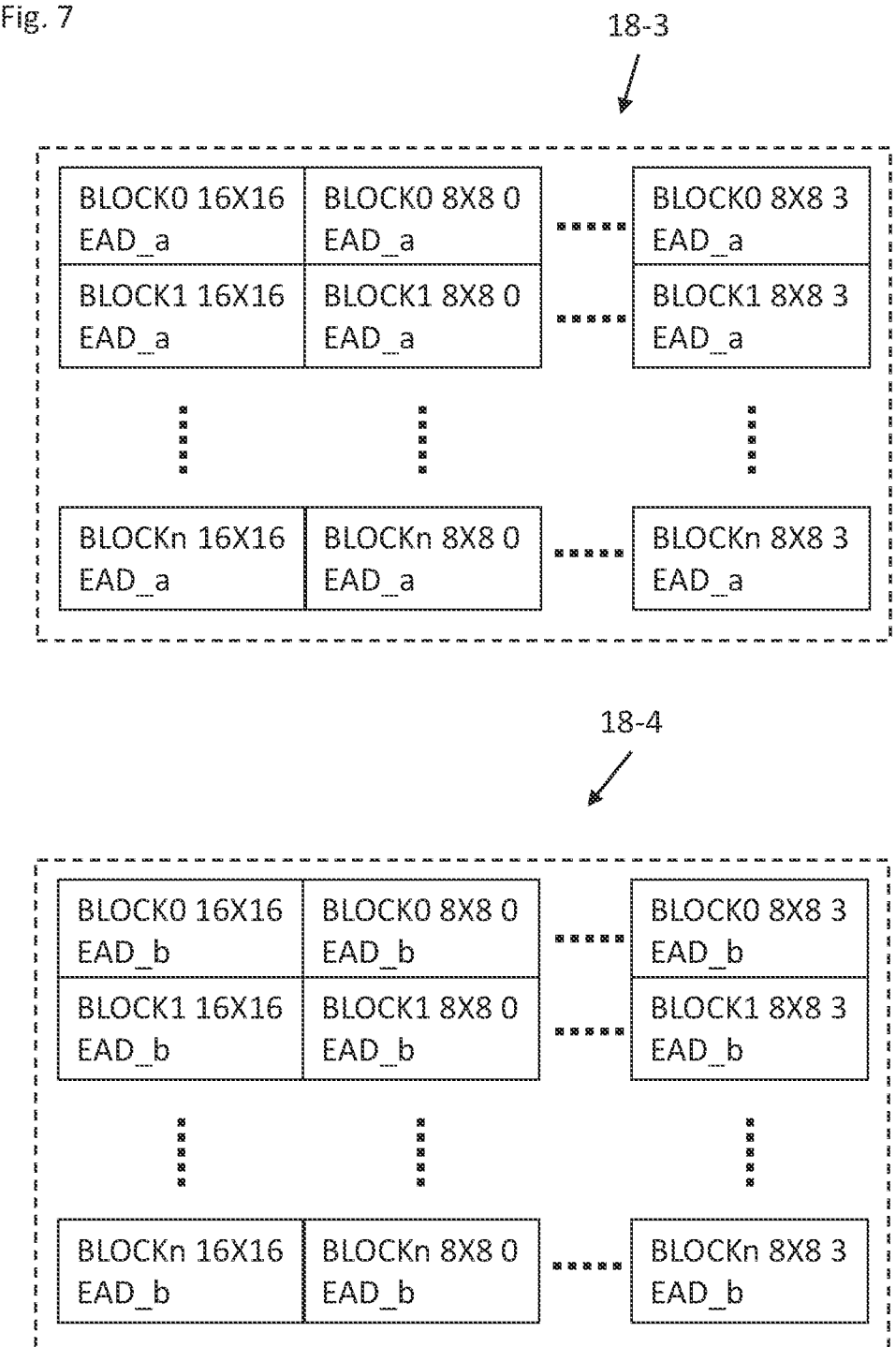
FIG. 7 is a schematic view of different database tables for data of different video encoding parameter types for use in the system of FIG. 1.

Reference is now made to FIG. 7, which is a schematic view of different database tables 18-3, 18-4 for data of different video encoding parameter types (EAD_a, EAD_B) for use in the system 10 of FIG. 1. Table 18-3 includes encoding assist data 16 for EAD_a, while table 18-4 includes encoding assist data 16 for EAD_b. In this manner, if the video encoding software 28 needs to process encoding assist data 16 for EAD_a, then table 18-3 is loaded into memory 26, while if the video encoding software 28 needs to process encoding assist data 16 for EAD_b, then table 18-4 is loaded into memory 26, thereby improving the data retrieval processes. In this manner, if an EAD type is added to the hybrid hardware-software encoding system 10, a new table for the EAD type may be generated and any changes to the hardware accelerator 12 and/or the video encoding software 28 are minimized.

Reference is now made to FIG. 8, which is a schematic view of different database tables 18-5, 18-6, 18-7, 18-8 for data of different block sizes (16×16 blocks and 8×8 blocks) and different video encoding parameter types (EAD_a, EAD_b) for use in the system 10 of FIG. 1. Table 18-5 includes data for video encoding parameter type EAD_a for 16×16 blocks. Table 18-6 includes data for video encoding parameter type EAD_a for 8×8 blocks. Table 18-7 includes data for video encoding parameter type EAD_b for 16×16 blocks. Table 18-8 includes data for video encoding parameter type EAD_b for 8×8 blocks. Splitting the encoding assist data 16 among the tables 18-5 to 18-8 further improves data retrieval and allows the hybrid hardware-software encoding system 10 to add new EAD types and block sizes while any changes to the hardware accelerator 12 and/or the video encoding software 28 are minimized.

Figure 9:
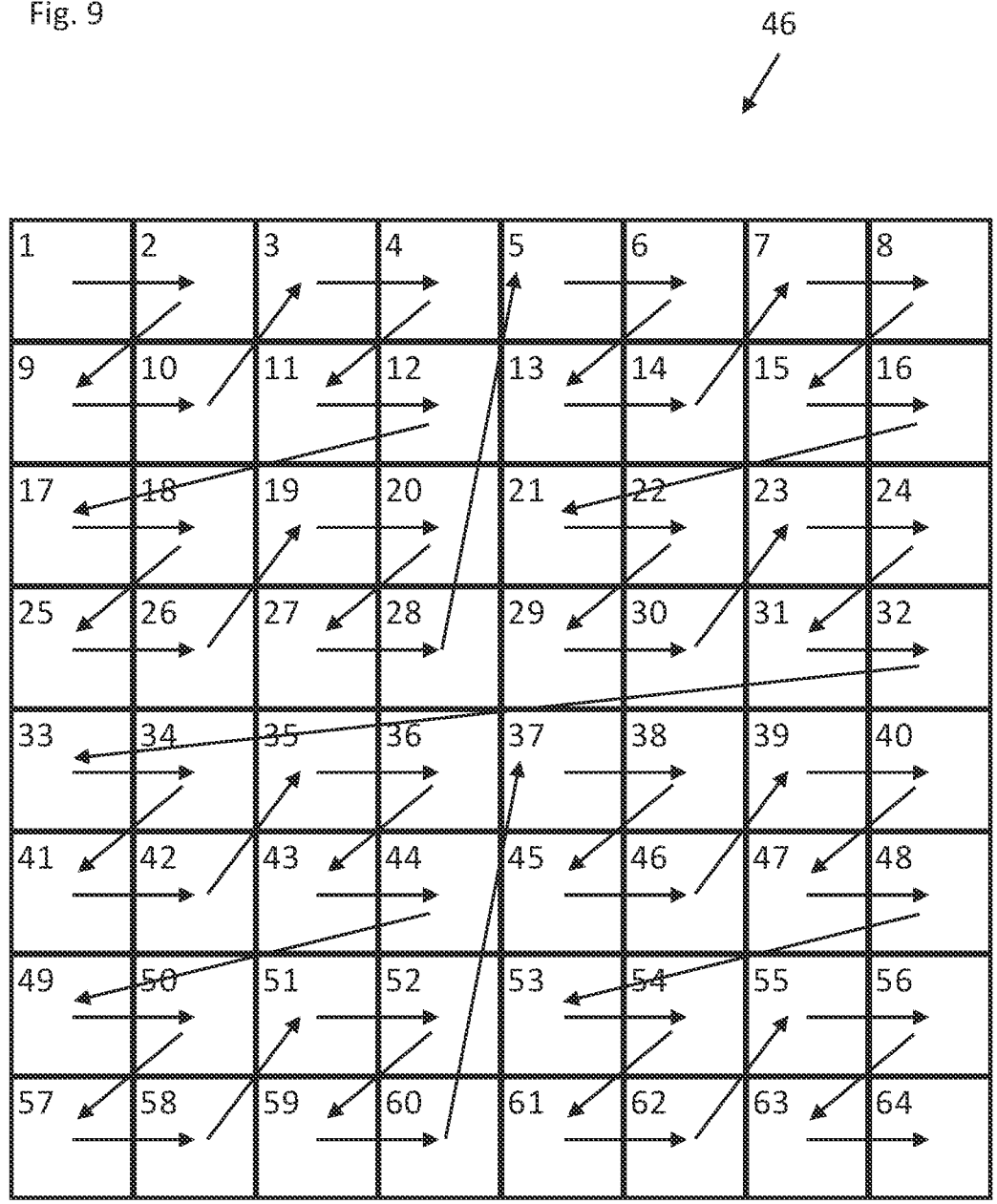
FIG. 9 is a schematic view of an image region being scanned using a z-shaped scan pattern.

Reference is now made to FIG. 9, which is a schematic view of an image region 46 being scanned using a z-shaped scan pattern. The hardware accelerator 12 may scan an image using a recursive z-shaped scan pattern (shown by the arrows in FIG. 9). If scanning is performed according to the numbers of the blocks in FIG. 9, the image would be scanned row-by-row. However, as the image is analyzed using different block sizes, it may be more efficient to scan the image region 46 using the z-shaped scan pattern. For example, if each of the squares shown in FIG. 9 represents a 4×4 pixel block, then blocks 1, 2, 9, 10 represent one 8×8 block, and blocks 3, 4, 11, 12 represent another 8×8 block and so on. Blocks 1-4, 8-12, 17-20, 25-28 represent one 16×16 block. Therefore, if the scan pattern is performed according to z-shaped scan pattern, the whole 16×16 block and all its sub-blocks are scanned before any other 16×16 block is scanned. In this manner, data retrieval to process the image and its block data is more efficient.

Figure 10:
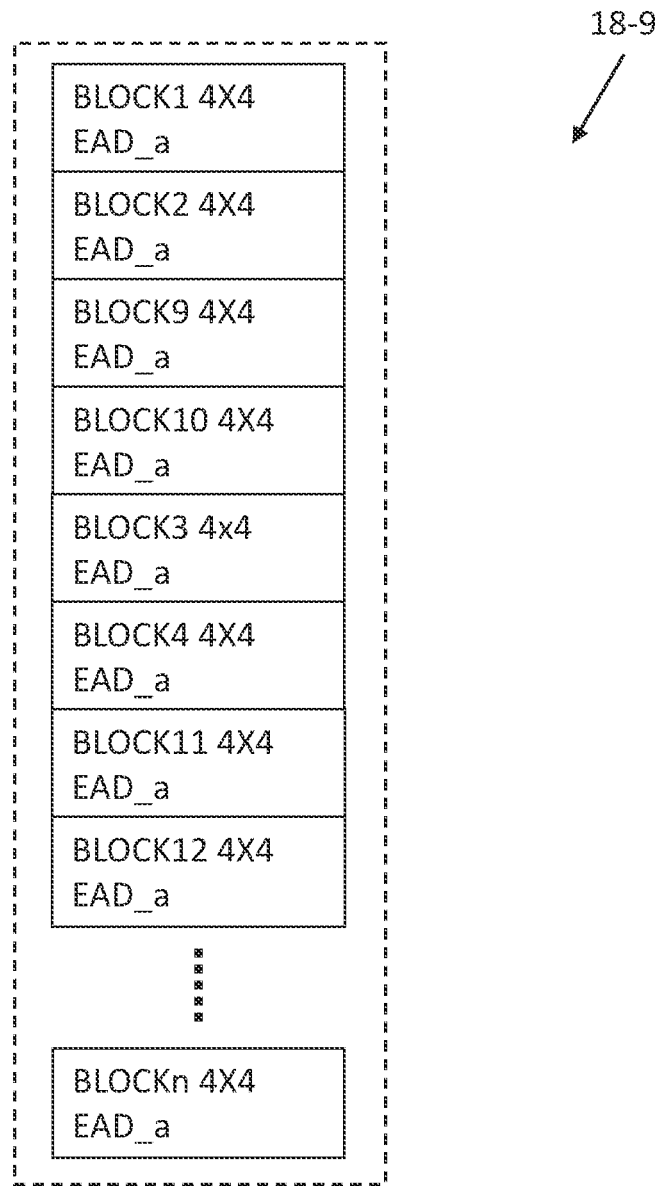
FIG. 10 is a schematic view of a database table including data according to the z-based scan pattern of FIG. 9.

Reference is now made to FIG. 10, which is a schematic view of a database table 18-9 including data ordered according to the z-based scan pattern of FIG. 9. Reference is also made to FIG. 9. As mentioned in FIG. 9, the z-based scan pattern does not follow the order of the number of the blocks shown in FIG. 9. Instead, the scan order is from block 1, 2, 9, 10, 3, 4, 11, 12, 17, 18, and so on, following the arrows shown in FIG. 9. In some embodiments, the encoding assist data 16 included in the database tables 18 generated by the hardware accelerator 12 may also be ordered according to the z-based scan pattern. Table 18-9 shown in FIG. 10 includes data ordered according to the z-based scan pattern, and includes blocks 1, 2, 9, 10, 3, 4, 11, and 12, and so on.

Figure 11:
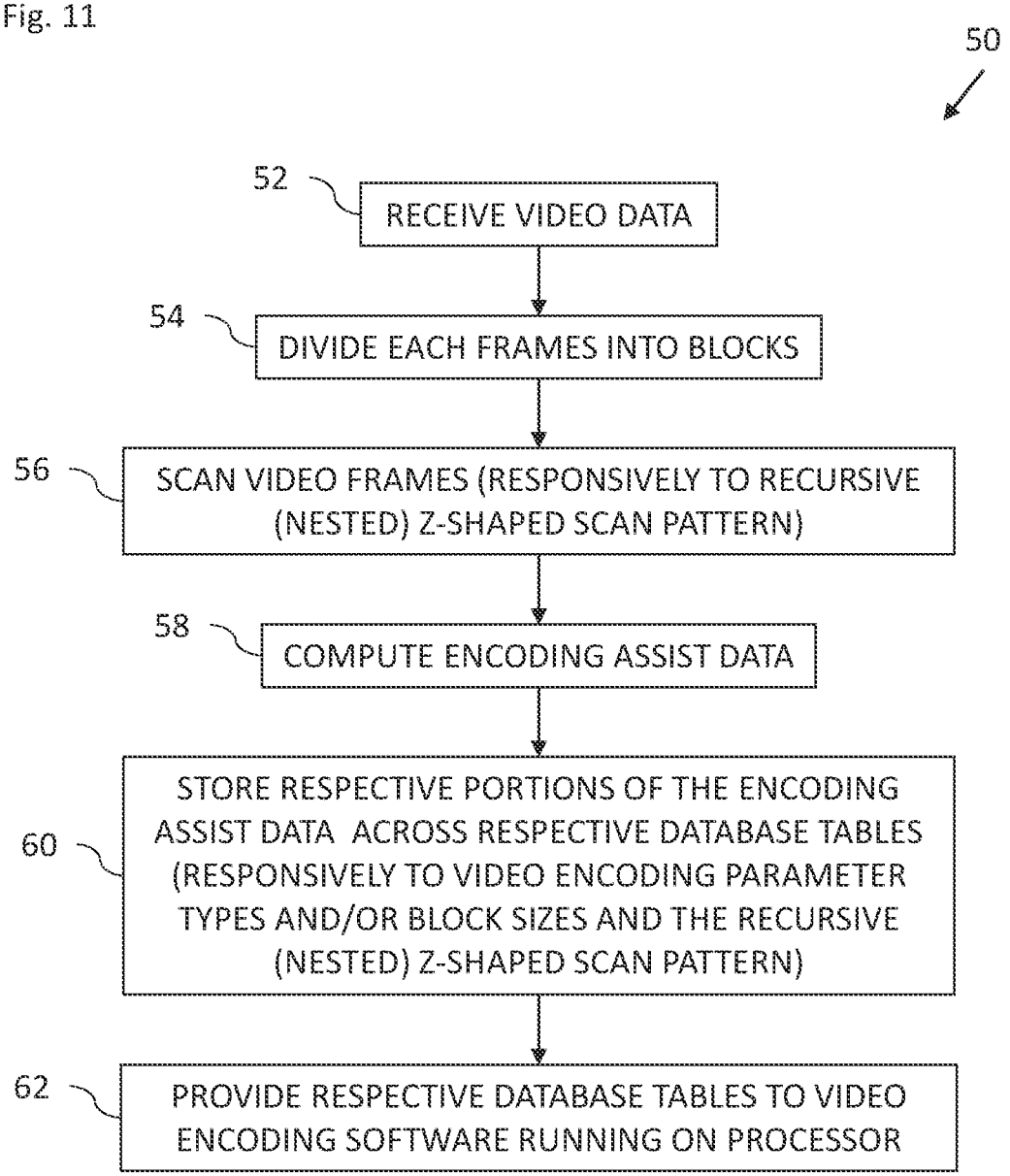
FIG. 11 is a flowchart including steps in a method of operation of a hardware accelerator of the system of FIG. 1.

Reference is now made to FIG. 11, which is a flowchart 50 including steps in a method of operation of the hardware accelerator 12 of the system 10 of FIG. 1. Reference is also made to FIG. 1. The hardware accelerator 12 is configured to (block 52) receive video data of multiple video frames 14. The hardware accelerator 12 is configured to divide (block 54) each of the video frames 14 into respective blocks (of different block sizes and/or block shapes). The hardware accelerator 12 is configured to scan (block 56) the video frames 14, optionally responsively to a recursive z-shaped scan pattern. In some embodiments, the recursive z-shaped scan pattern is a nested z-shaped scan pattern. The hardware accelerator 12 is configured to compute (block 58) the encoding assist data 16 including at least one video encoding parameter type for each of the respective blocks of each of the video frames. The hardware accelerator 12 is configured to store (block 60) respective portions of the encoding assist data 16 across respective database tables 18. In some embodiments, the hardware accelerator 12 is configured to store the respective portions of the encoding assist data 16 across the respective database tables 18 responsively to respective video encoding parameter types and/or respective block sizes. In some embodiments, the hardware accelerator 12 is configured to store the encoding assist data 16 ordered in the respective database tables 18 responsively to the recursive z-shaped scan pattern. The interface 22 is configured to provide (block 62) the respective database tables 18 to the video encoding software 28 running on the processor 20.

Figure 12:
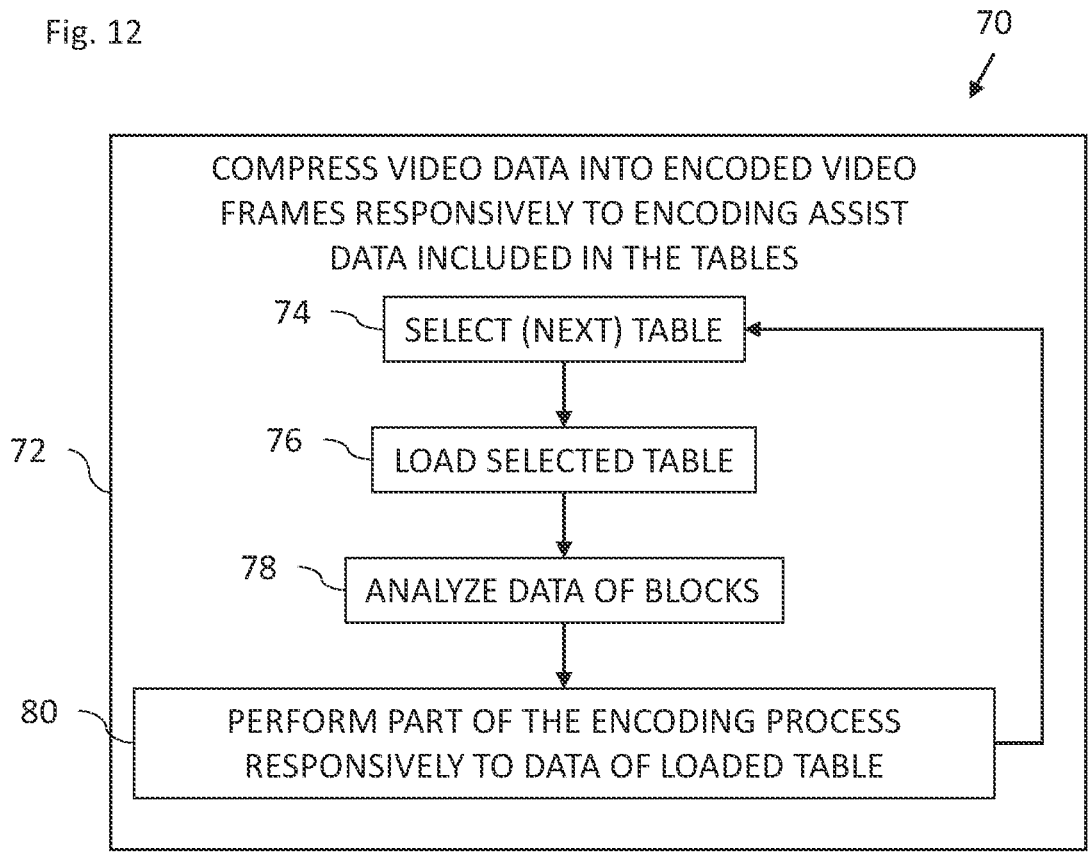
FIG. 12 is a flowchart including steps in a method of operation of encoding software running on a processor of the system of FIG. 1.

Reference is now made to FIG. 12, which is a flowchart 70 including steps in a method of operation of the video encoding software 28 running on the processor 20 of the system 10 of FIG. 1. Reference is also made to FIG. 1. The video encoding software 28 is configured to compress (block 72) the video data of the video frames 14 into encoded video frames 30 responsively to the encoding assist data 16 included in the respective database tables 18. Sub-steps of the step of block 72 are now described below.

The video encoding software 28 is configured to select (block 74) one or more of the database tables 18, and load (block 76) the selected table(s) 18 into the memory 26. The video encoding software 28 is configured to analyze (block 78) the encoding assist data 16 of the blocks included in the loaded table(s) 18, and perform (block 80) part of the encoding process responsively to the encoding assist data 16 of the loaded table(s). The steps of blocks 74-80 may be repeated for another table or tables 18, loading the selected other database tables 18, analyzing the encoding assist data 16 in the other loaded table(s) 18, and performing another part of the encoding process responsively to the data of the other loaded table(s), and so on.

Therefore, the video encoding software 28 may be configured to load a first table 18 into memory 26 and perform a first part of the encoding process responsively to data of the loaded first table 18, and then load a second table 18 into memory 26 and perform a second part of the encoding process responsively to data of the loaded second table.

In some cases, the first table may include respective video encoding parameters of a first video encoding parameter type for selected blocks of one or more of the video frames, and the second table may include respective video encoding parameters of a second video encoding parameter type, different to the first video encoding parameter type, for the selected blocks. By way of example, the first video encoding parameter type (of the first table) may be a motion vector, and the first part of the encoding process may include performing rate control responsively to motion vectors in the first table. By way of example, the second video encoding parameter type of the second table may be a measure of block matching, and the second part of the encoding process may include identifying a scene cut responsively to measures of block matching in the second table.

In other cases, the first table may include selected blocks of a first block size (of one or more of the video frames), and the second table may include other selected blocks of a second block size different to the first block size (of the video frame(s)). By way of example, the first block size may be larger than the second block size, and the video encoding software 28 may be configured to load the first table (of the larger block size) and analyze data of the blocks of the first block size, and then (if needed) load the second table (of the smaller block size) and analyze data of the blocks of the second block size.

Figure 13:
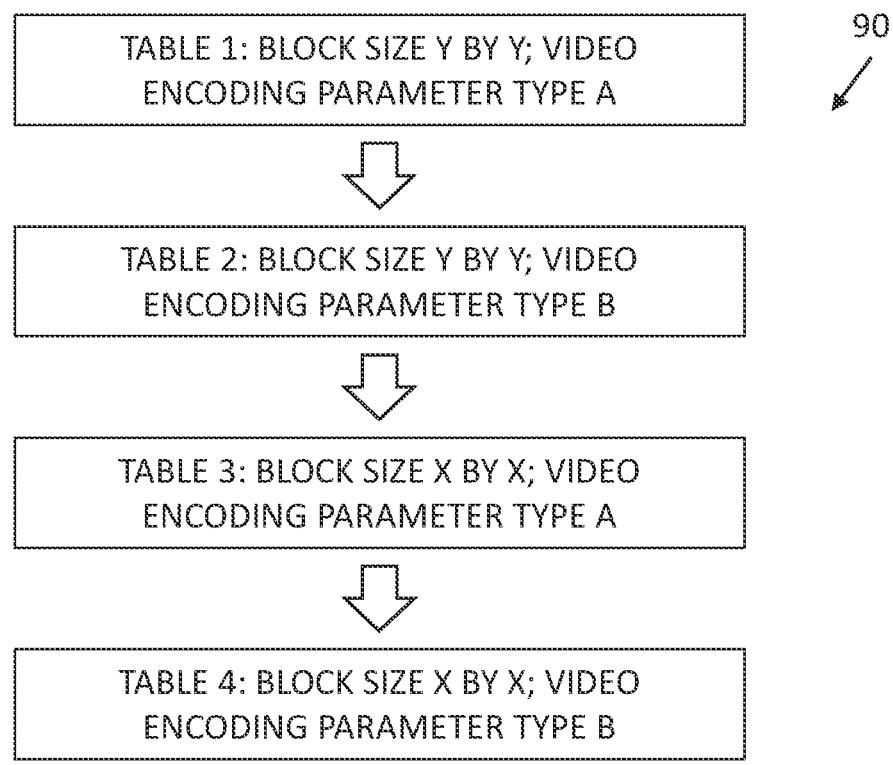
FIG. 13 is a schematic view of an example order of database tables selection in the system of FIG. 1.

Reference is now made to FIG. 13, which is a schematic view of an example order 90 of database table selection in the system 10 of FIG. 1.

In the example of FIG. 13, the video encoding software 28 may be configured to: load table 1 into memory 26 and perform a first part of the encoding process responsively to data of loaded table 1; then load table 2 into memory 26 and perform a second part of the encoding process responsively to data of loaded table 2; then load table 3 into memory 26 and perform a third part of the encoding process responsively to data of loaded table 3; and then load table 4 into memory 26 and perform a fourth part of the encoding process responsively to data of loaded table 4. In the example of FIG. 13 table 1 includes respective video encoding parameters of video encoding parameter type A for blocks of block size Y by Y, table 2 includes respective video encoding parameters of video encoding parameter type B for blocks of block size Y by Y, table 3 includes respective video encoding parameters of video encoding parameter type A for blocks of block size X by X, and table 4 includes respective video encoding parameters of video encoding parameter type B for blocks of block size X by X.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

ANNEX: HARDWARE ACCELERATED INTRA PREDICTION DIRECTION ESTIMATION

1. Introduction and Problems Formulations.

In common video coding standards (AVC, VP9, HEVC, AV1 and VVC) intra predictions for texture blocks include angular (directional) intra predictions and non-angular intra predictions. Angular intra prediction modes corresponded to an angle so that for texture prediction the data of the neighboring block pixels is propagated to the block interior at this angle. Due to the large number of possible intra prediction angles (e.g., 65 in VVC) the procedure of choosing the optimal intra prediction may become very complex and the challenge of simplifying it is important to overall encoder performance.

The technique disclosed herein implements an Intra Prediction hint for Hardware-based accelerators (GPU/FPGA/ASIC), providing universal method for optimization of Intra Prediction decisions for various block-based encoders.

2. Minimal Activity Direction Approach.

Minimal activity direction may be interpreted as the direction inside the area S in which the variation of the function is minimal. In particular, minimal activity direction of the picture area is the direction of the most noticeable boundaries and lines inside the selected area S.

Denote, $$E = \left( \sum_{(x,y) \in S} Dx^2(x, y) - \sum_{(x,y) \in S} Dy^2(x, y) \right)$$

$$F = \left( \sum_{(x,y) \in S} Dx(x, y) \cdot Dy(x, y) \right)$$

Where $Dx(x,y)$ and $Dy(x,y)$ are the difference values between the pixels to the left and right of pixel $(x,y)$ and between the pixels above and below pixel $(x,y)$, accordingly.

The further calculations are performed according to the following four cases:

| | |
|---|---|
| $E \leq 0$ and $F < 0$ | Case 1: |
| $E > 0$ and $F < 0$ | Case 2: |
| $E \geq 0$ and $F \geq 0$ | Case 3: |
| $E < 0$ and $F \geq 0$ | Case 4: |

Those four cases correspond to directional angles in the intervals:

$$[0; \pi/4], [\pi/4, \pi/2], [\pi/2, 3\pi/4], [3\pi/4, \pi]$$

Solving the minimization problem explicitly, one can obtain the following expressions for minimal activity direction:

$$A = \sqrt{\frac{E^2}{E^2 + 4 \cdot F^2}}$$

Then, for each of the four cases we defined we have:

| | |
|---|---|
| $\alpha(S) = \sqrt{(1+A)/2}$ | Case 1: |
| $\alpha(S) = \sqrt{(1-A)/2}$ | Case 2: |
| $\alpha(S) = -\sqrt{(1-A)/2}$ | Case 3: |
| $\alpha(S) = -\sqrt{(1+A)/2}$ | Case 4: |

The corresponding direction angle is calculated as $$\varphi = \arccos(\alpha(S))$$

For each case 1-4 defined above there is a one-to-one correspondence between the value of the intra prediction direction defined by the angle $\varphi(S,W)$ and the value of the ratio $$\left| \frac{E}{F} \right| \left( \text{or } \left| \frac{F}{E} \right| \right).$$

That is why in practical usage the approximate calculation of the minimal activity directions and the corresponding angular intra prediction mode may be simplified significantly by using some pre-calculated tables.

3. Hardware and Software Algorithm Partitioning

The most computational extensive part can be effectively executed in hardware, while codec-dependent mapping of minimal activity direction to exact intra-direction mode should be performed on CPU. For estimation of minimal activity direction for various block sizes, it is necessary to calculate the following values:

$$Ex = \left(\sum_{(x,y)\in S} Dx^2(x, y)\right)$$

$$Ey = \left(\sum_{(x,y)\in S} Dy^2(x, y)\right)$$

$$F = \left(\sum_{(x,y)\in S} Dx(x, y) \cdot Dy(x, y)\right)$$

Ex, Ey and F should be calculated for each 8×8 block in picture, assuming 8×8 is the minimal intra-prediction block size. For bigger intra blocks, values calculated for 8×8 can be grouped using simple summation.

4. Practical Implementation in Hardware

For blocks 8×8, simplified pseudocode of HW-part for Intra direction estimation, without access to neighboring pixels, could as simple, as following:

```
void IntraHint8x8_HW_Part(uint8_t Block[8][8], int & Ex,
int & Ey, int & F)
{
  Ex = Ey = F = 0;
  for (int y = 1; y < 7; y++)
    for (int x = 1; x < 7; x++)
    {
      int DX = (Block[y][x+1] - Block[y][x-1]);
      int DY = (Block[y+1][x] - Block[y-1][x]);
      Ex += (iDX*iDX);
      Ey += (iDY*iDY);
      F  += (iDX*iDY);
    }
}
```

For full picture processing, with boundaries handled by padding, the following code could be used:

```
void intra_hint_HW(int width, int height,
       uchar * Src, int s/src_stride*/,
       int * Dst, int d/dst_stride*/)
{
  for(int y=0;y<height;y+=8)
  for(int x=0;x<width;x+=8)
  {
    uchar * S = Src + y*s + x;
    int * D = Dst + (y/8)*d + (x/8)*3;
    int Ex = 0, Ey = 0, F = 0;
    for(int Y=0; Y<8; Y++,S+=s)
      for(int X=0; X<8; X++)
      {
        int DX = (S[X-1] - S[X+1]);
        int DY = (S[X-s] - S[X+s]);
        Ex += DX*DX;
        Ey += DY*DY;
        F += DX*DY;
      }
    D[0] = Ex; D[1] = Ey; D[2] = F;
  }
}
```

Accuracy(bits) of Ex, Ey and F could be reduced, but in this case, values should be scaled accordingly.

5. Codec Agnostic Hardware Assist to Software

Modern Video standards contain intra prediction as a common idea but differ in the details. 2 major differences:
  1. The various standards allow different block partitioning
  2. The various standards allow different numbers of angles to be predicted in intra coding In exemplary embodiments of the present invention, note that the block partitioning problem has already been solved (see above description), based on generic and scalable 8×8 blocks, which can be aggregated to any appropriated desired partition size. The different angle is solved by the fact that we can narrow down the direction dramatically as described herein; it is then typically software which chooses the best, or a best, codec-dependent angle to use for prediction. We give here as an example, the implementation part (typically performed in software) for HEVC encoders.

The following non-limiting exemplary code illustrates an appropriate hardware implementation:

```
Code for HW-part of Intra-Direction Hint:
void IntraHint8x8_HW_Part(uint8_t Block[8][8], int
iDW[3])
{
  for (int y = 1; y < 7; y++)
  for (int x = 1; x < 7; x++)
  {
    int iDX = (Block[y][x+1] - Block[y][x-1]);
    int iDY = (Block[y+1][x] - Block[y-1][x]);
    iDW[0] += (iDX*iDX);
    iDW[1] += (iDY*iDY);
    iDW[2] += (iDX*iDY);
  }
}
```

6. Pre-Calculated Tables for HEVC Encoder.

A proven implementation is HEVC encoder with up to 35 intra prediction modes. Using proposed technique and pre-calculated tables it is possible to predict Intra Direction in simple and effective way.

```
/*
  Software part of Intra Direction prediction algorithm
  for HEVC
  (will be different for various encoders)
  iDW[3] values (Ex = X*X, Ey = Y*Y, F = X*Y) could be
  pre-calculated in HW for blocks 8x8
  and grouped for different block sizes.
  (c) Beamr Imaging Ltd 2019, All Rights Reserved
*/
int CalcIntraDirection_HEVC(int iDW[3], int iDefaultDir =
0)
{
  if (iDW[0] + iDW[1] != 0)
  {
    int uiN1 = (int)(iDW[2] >= 0 ? iDW[2] : -
iDW[2]);
    int uiN2 = (int)((iDW[0] - iDW[1]) >= 0 ?
(iDW[0] - iDW[1]) : - (iDW[0] - iDW[1]));
    if (uiN1 != 0 | | uiN2 != 0)
    {
      int bAQInverse = (uiN1 >= uiN2);
      int uiAQ128 = bAQInverse ? (uiN2
* 128 + uiN1 / 2) / uiN1 :
                   (uiN1 *
128 + uiN2 / 2) / uiN2;
      int iQAngleMult128;
      if ((iDW[2] >= 0 && iDW[0] >=
iDW[1]) | | (iDW[2] < 0 && iDW[0] <= iDW[1]))
      {
        if (iDW[2] < 0) // [0;
pi/4]
        iQAngleMult128 =
        pAq128ToAngle128_1[bAQInverse][uiAQ128];
          else    // [pi/2;
3*pi/4]
        iQAngleMult128 = 402 -
        pAq128ToAngle128_2[bAQInverse][uiAQ128];
      }
      else
      {
        if (iDW[2] < 0) // [[pi/4;
pi/2]
        iQAngleMult128 =
        pAq128ToAngle128_2[bAQInverse][uiAQ128];
          else    // [3*pi/4;
```

```
            pi]
                iQAngleMult128 = 402 −
pAq128ToAngle128__1[bAQInverse][uiAQ12
8];
            }
            int dir = piAngle128ToMode[402 −
iQAngleMult128]; // predicted direction
            float a__ = AandB[dir][0];
            float b__ = AandB[dir][1];
            float c2 = CalcC2(iDW[0],
iDW[1], iDW[2], a__, b__);
            if (c2 >= 3.0f) return dir;
        }
    }
    return iDefaultDir; // angle could not be determined
}
// helping functions and tables
float CalcC2(int& iDW[0], int& iDW[1], int& iDW[2], const
float& a, const float& b)
{
    const float B = b * b;
    const float A = a * a;
    const float C1 = B * iDW[0] − 2 * b * a * iDW[2] + A
* iDW[1];
    const float C2 = A * iDW[0] + 2 * b * a * iDW[2] + B
* iDW[1];
    return C1 / C2;
}
const int pAq128ToAngle128__1[2][129] =
{
    {
        0, 1, 2, 3, 4, 5, 6, 7, 8, 9, 10, 11, 12,
13, 14, 15, 16, 17, 18, 18,
        19, 20, 21, 22, 23, 24, 25, 26, 26, 27,
28, 29, 30, 30, 31, 32, 33, 34, 34, 35,
        36, 36, 37, 38, 39, 39, 40, 41, 41, 42,
42, 43, 44, 44, 45, 45, 46, 47, 47, 48,
        48, 49, 49, 50, 50, 51, 51, 52, 52, 53,
53, 54, 54, 54, 55, 55, 56, 56, 57, 57,
        57, 58, 58, 58, 59, 59, 60, 60, 60, 61,
61, 61, 62, 62, 62, 63, 63, 63, 64, 64,
        64, 64, 65, 65, 65, 65, 66, 66, 66, 67,
67, 67, 67, 68, 68, 68, 68, 69, 69,
        69, 69, 70, 70, 70, 70, 70, 71, 71
    },
    {
        101, 100, 100, 100, 100, 99, 99, 99, 99,
98, 98, 98, 98, 97, 97, 97, 97, 96, 96, 96,
        96, 95, 95, 95, 95, 94, 94, 94, 94, 93,
93, 93, 93, 92, 92, 92, 92, 91, 91, 91,
        91, 90, 90, 90, 90, 89, 89, 89, 89, 88,
88, 88, 88, 87, 87, 87, 87, 86, 86,
        86, 86, 85, 85, 85, 85, 84, 84, 84, 84,
83, 83, 83, 83, 83, 82, 82, 82, 82, 81,
        81, 81, 81, 80, 80, 80, 80, 79, 79,
79, 79, 78, 78, 78, 78, 78, 77, 77, 77,
        77, 76, 76, 76, 76, 76, 75, 75, 75, 75,
75, 74, 74, 74, 74, 74, 73, 73, 73, 73,
        72, 72, 72, 72, 72, 71, 71, 71, 71
    }
};
const int pAq128ToAngle128__2[2] [129] =
{
    {
        201, 200, 199, 198, 197, 196, 195, 194, 193, 192, 191,
190, 189, 188, 187, 186, 185, 184, 184, 183,
        182, 181, 180, 179, 178, 177, 176, 176, 175, 174, 173,
172, 171, 171, 170, 169, 168, 168, 167, 166,
        165, 165, 164, 163, 163, 162, 161, 161, 160, 159, 159,
158, 157, 157, 156, 156, 155, 154, 154, 153,
        153, 152, 152, 151, 151, 150, 150, 149, 149, 148, 148,
147, 147, 147, 146, 146, 145, 145, 145, 144,
        144, 143, 143, 142, 142, 141, 141, 141, 140, 140,
140, 139, 139, 139, 138, 138, 138, 137,
        137, 137, 136, 136, 136, 135, 135, 135, 134,
134, 134, 134, 133, 133, 133, 132, 132,
        132, 132, 131, 131, 131, 131, 130, 130
    },
    {
        101, 101, 101, 101, 102, 102, 102, 102, 103, 103, 103,
103, 104, 104, 104, 104, 105, 105, 105, 105,
        106, 106, 106, 106, 107, 107, 107, 107, 108, 108, 108,
108, 108, 109, 109, 109, 109, 110, 110, 110,
        110, 111, 111, 111, 111, 112, 112, 112, 112, 113, 113,
113, 113, 114, 114, 114, 114, 115, 115, 115,
        115, 116, 116, 116, 116, 116, 117, 117, 117, 117, 118,
118, 118, 118, 119, 119, 119, 119, 119, 120,
        120, 120, 120, 121, 121, 121, 121, 121, 122, 122, 122,
122, 123, 123, 123, 123, 123, 124, 124, 124,
        124, 125, 125, 125, 125, 125, 126, 126, 126, 126, 127,
127, 127, 127, 127, 128, 128, 128, 128, 128,
        129, 129, 129, 129, 129, 130, 130, 130, 130
    }
};
const int piAngle128ToMode[403] =
{
    10, 10, 10, 10,
    9, 9, 9, 9, 9, 9, 9, 9, 9, 9,
    8, 8, 8, 8, 8, 8, 8, 8, 8, 8, 8, 8, 8, 8, 8,
    7, 7, 7, 7, 7, 7, 7, 7, 7, 7, 7, 7, 7, 7, 7,
    6, 6, 6, 6, 6, 6, 6, 6, 6, 6, 6, 6, 6,
    5, 5, 5, 5, 5, 5, 5, 5, 5, 5, 5, 5, 5,
    4, 4, 4, 4, 4, 4, 4, 4, 4, 4, 4, 4,
    3, 3, 3, 3, 3, 3, 3, 3, 3, 3, 3, 3, 3,
    2, 2, 2, 2, 2, 2,
    34, 34, 34, 34, 34, 34, 34, 34,
    33, 33, 33, 33, 33, 33, 33, 33, 33, 33, 33, 33, 33,
    32, 32, 32, 32, 32, 32, 32, 32, 32, 32, 32, 32,
    31, 31, 31, 31, 31, 31, 31, 31, 31, 31, 31, 31, 31,
    30, 30, 30, 30, 30, 30, 30, 30, 30, 30, 30, 30, 30,
    29, 29, 29, 29, 29, 29, 29, 29, 29, 29, 29, 29, 29,
29, 29,
    28, 28, 28, 28, 28, 28, 28, 28, 28, 28, 28, 28, 28,
28,
    27, 27, 27, 27, 27, 27, 27, 27, 27, 27,
    26, 26, 26, 26, 26, 26, 26, 26,
    25, 25, 25, 25, 25, 25, 25, 25, 25,
    24, 24, 24, 24, 24, 24, 24, 24, 24, 24, 24, 24,
24,
    23, 23, 23, 23, 23, 23, 23, 23, 23, 23, 23, 23,
23, 23,
    22, 22, 22, 22, 22, 22, 22, 22, 22, 22, 22, 22,
22,
    21, 21, 21, 21, 21, 21, 21, 21, 21, 21, 21, 21,
    20, 20, 20, 20, 20, 20, 20, 20, 20, 20, 20, 20,
    19, 19, 19, 19, 19, 19, 19, 19, 19, 19, 19, 19, 19,
    18, 18, 18, 18, 18, 18, 18, 18, 18, 18, 18, 18, 18,
18,
    17, 17, 17, 17, 17, 17, 17, 17, 17, 17, 17, 17, 17,
    16, 16, 16, 16, 16, 16, 16, 16, 16, 16, 16, 16,
    15, 15, 15, 15, 15, 15, 15, 15, 15, 15, 15, 15, 15,
    14, 14, 14, 14, 14, 14, 14, 14, 14, 14, 14, 14, 14,
    13, 13, 13, 13, 13, 13, 13, 13, 13, 13, 13, 13, 13,
13, 13,
    12, 12, 12, 12, 12, 12, 12, 12, 12, 12, 12, 12, 12,
12,
    11, 11, 11, 11, 11, 11, 11, 11, 11, 11,
    10, 10, 10, 10
};
const float AandB[35][2] = // [i] − dir angle [0] − a
[1] − b
{
    {0.f, 0.f},
    {0.f, 0.f},
    { 0.707f, −0.707f },      // dir 2
    { 0.776f, −0.631f },      // dir 3
    { 0.836f, −0.549f },      // dir 4
    { 0.883f, −0.469f },      // dir 5
    { 0.926f, −0.376f },      // dir 6
    { 0.963f, −0.271f },      // dir 7
    { 0.988f, −0.154f },      // dir 8
    { 0.998f, −0.062f },      // dir 9
    { 1.000f, 0.000f },       // dir 10
    { 0.998f, 0.062f },       // dir 11
    { 0.988f, 0.154f },       // dir 12
    { 0.963f, 0.271f },       // dir 13
    { 0.926f, 0.376f },       // dir 14
    { 0.883f, 0.469f },       // dir 15
```

-continued

| | |
|---|---|
| { 0.836f, 0.549f }, | // dir 16 |
| { 0.776f, 0.631f }, | // dir 17 |
| { 0.707f, 0.707f }, | // dir 18 |
| { 0.631f, 0.776f }, | // dir 19 |
| { 0.549f, 0.836f }, | // dir 20 |
| { 0.469f, 0.883f }, | // dir 21 |
| { 0.376f, 0.926f }, | // dir 22 |
| { 0.271f, 0.963f }, | // dir 23 |
| { 0.154f, 0.988f }, | // dir 24 |
| { 0.062f, 0.998f }, | // dir 25 |
| { −0.000f, 1.000f }, | // dir 26 |
| { −0.062f, 0.998f }, | // dir 27 |
| { −0.154f, 0.988f }, | // dir 28 |
| { −0.271f, 0.963f }, | // dir 29 |
| { −0.376f, 0.926f }, | // dir 30 |
| { −0.469f, 0.883f }, | // dir 31 |
| { −0.549f, 0.836f }, | // dir 32 |
| { −0.631f, 0.776f }, | // dir 33 |
| { −0.707f, 0.707f }, | // dir 34 |
| }; | |

II. Hardware Accelerated Intra Mode Hint

1. Introduction

In common video coding standards (AVC, VP9, HEVC, AV1 and VVC), blocks in non intra frames may be coded in either inter mode—using reconstructed pixels from previously encoded frames as reference, or in intra mode, using reconstructed pixels from previously encoded pixels in the current frame as reference. The supported prediction modes differ somewhat between different encoders, but similar principles are applied. In a specific encoder implementation, it is up to the encoder to make the best decisions, in a rate-distortion sense, as to which coding mode should be selected for each coding block.

In order to make this decision the encoder must evaluate how well a specific prediction mode applies to the coding block, usually measuring the rate, or number of bits associated with encoding in a candidate mode, and the distortion of this candidate mode as represented the residual or error of the prediction.

Performing these evaluations in software can be very time consuming and therefore we propose a joint HW/SW solution where the expensive "generic" computations are performed in HW, resulting in "intra hint" information, and this information is used by the SW to make the decision on prediction mode for the block, where this is an encoder specific decision and may differ according to specific encoder implementations.

2. Proposed Algorithm

While it is theoretically possible to perform an exhaustive search over all possible prediction modes for both intra and inter modes, calculating actual cost values for each mode, and selecting the mode with the lowest cost, this is very compute intense and not relevant at reasonable encoding speeds.

Therefore, we propose to efficiently find an intra prediction cost, as described below. Then, according to a relation between this intra cost value and the best inter prediction cost, found by the motion estimation module, it will be determined whether the block will be encoded in inter or intra mode.

The intra prediction cost is measured as a difference between the coding block pixels and the predicted block pixel values, obtained by predicting the block from previously encoded and reconstructed pixels in one of the intra prediction modes employed by the encoder in use. The difference is calculated using for example Sum of Absolute Differences (SAD), Sum of Squared Differences (SSD) or Sum of Absolute Transformed Differences (SATD)—which often employs the well-known Hadamard transform and thus is also labeled herein as Hadamard Absolute Difference or HAD.

The prediction used to calculate the difference may be only a simple DC prediction, where the average value of the neighboring reconstructed pixels is taken as the prediction value for all pixels in the encoding block. It may use Planar prediction, where a linear "plane" function is fitted to the neighboring pixels.

To obtain a more accurate intra cost, it is possible to further calculate the cost associated with more sophisticated angular predictions, but this comes at the price of more required calculations which may not be justified for the benefit provided by this.

For a SW/HW solution, which can be generically applied to many different encoding standards or implementations, we propose to calculate the intra cost in HW, for either only the DC prediction, or only for the Planar prediction or for both. The SW will receive this value form the HW and compare it to the Inter cost previously obtained in the motion estimation—optionally using the hybrid HW/SW module, and determine if the block should be coded in inter or intra mode.

3. Examples of Implementation

Below are provided implementation examples of the DC and planar prediction functions, as well as implementations of some possible cost or difference functions to use—as described above.

While we have SW implementations covering also angular costs, as this is quite coded dependent, it seems less advisable to implement these in HW.

1. DC Prediction

```
uint16_t ASMCALL vpaIntraHintDC(uint8_t * O, int stride,
uint8_t* pdirection, void* cost_func)
{
    vpaCost16x16_8b_f* cost16x16_8b_func =
(vpaCost16x16_8b_f*)cost_func;
    unsigned int DC = 0;
    uint8_t pred[16]; //creating memory of one line of
prediction
    for(int i=0;i<16;i++)
        DC += O[i-stride] + O[i*stride−1]; //calculate DC
as average of outer left line and outer top line
    for (int i = 0; i < 16; i++)
        pred[i] = (DC >> 5);
    *pdirection = 1;
    return cost16x16_8b_func(O, stride, (uint8_t*)pred,
0); //as all lines are same we pass only one line with 0
stride;
}
```

2. Planar Prediction

```
uint16_t ASMCALL vpaIntraHintPlanarCost(uint8_t * O, int
stride, uint8_t* pdirection, void* cost_func)
{
    vpaCost16x16_8b_f* cost16x16_8b_func =
(vpaCost16x16_8b_f*)cost_func;
    uint8_t * src = O;
    uint8_t * top = &src[−stride];
    uint8_t pred[16 * 16];
    uint8_t * dst = pred;
    for (int32_t i = 0; i < 16; i++, src += stride, dst
+= 16)
        for (int32_t j = 0; j < 16; j++)
```

```
    dst[j] = ((src[-1] + top[j] + 1) >> 1);
//simplified planar prediction = average of outer top
line and outer left column
    src = O;
    *pdirection = 0; //prediction type used as output;
    return cost16x16_8b_func(pred, 16, src, stride);
//calculating cost value
}
```

3. SAD Cost Function

```
uint32_t xCalcSAD16x16_8b( const uint8_t* pi0, int32_t
iStride0, const uint8_t* pi1, int32_t iStride1)
{
    int j, k;
    int sad = 0;
    for (k = 0; k < 16; k++, pi0+=iStride0,
pi1+=iStride1)
    {
        for (j = 0; j < 16; j++)
        {
            sad+=abs((int)pi0[j] - (int)pi1[j]);
        }
    }
    return sad;
}
```

4. HAD 8×8 Cost Function

```
static uint32_t xCalcHAD8x8_8b( const uint8_t *piOrg,
int32_t iStrideOrg, const uint8_t *piCur, int32_t
iStrideCur)
{
    int32_t iStep = 1;
    int32_t k, i, j, jj, sad=0;
    int32_t diff[64], m1[8][8], m2[8][8], m3[8][8];
    int32_t iStep2 = iStep<<1;
    int32_t iStep3 = iStep2 + iStep;
    int32_t iStep4 = iStep3 + iStep;
    int32_t iStep5 = iStep4 + iStep;
    int32_t iStep6 = iStep5 + iStep;
    int32_t iStep7 = iStep6 + iStep;
    for( k = 0; k < 64; k+=8 )
    {
        diff[k+0] = (int)piOrg[0] - (int)piCur[    0];
        diff[k+1] = (int)piOrg[1] - (int)piCur[iStep ];
        diff[k+2] = (int)piOrg[2] - (int)piCur[iStep2];
        diff[k+3] = (int)piOrg[3] - (int)piCur[iStep3];
        diff[k+4] = (int)piOrg[4] - (int)piCur[iStep4];
        diff[k+5] = (int)piOrg[5] - (int)piCur[iStep5];
        diff[k+6] = (int)piOrg[6] - (int)piCur[iStep6];
        diff[k+7] = (int)piOrg[7] - (int)piCur[iStep7];
        piCur += iStrideCur;
        piOrg += iStrideOrg;
    }
//horizontal
    for (j=0; j < 8; j++)
    {
        jj = j << 3;
        m2[j][0] = diff[jj  ] + diff[jj+4];
        m2[j][1] = diff[jj+1] + diff[jj+5];
        m2[j][2] = diff[jj+2] + diff[jj+6];
        m2[j][3] = diff[jj+3] + diff[jj+7];
        m2[j][4] = diff[jj  ] - diff[jj+4];
        m2[j][5] = diff[jj+1] - diff[jj+5];
        m2[j][6] = diff[jj+2] - diff[jj+6];
        m2[j][7] = diff[jj+3] - diff[jj+7];
        m1[j][0] = m2[j][0] + m2[j][2];
        m1[j][1] = m2[j][1] + m2[j][3];
        m1[j][2] = m2[j][0] - m2[j][2];
        m1[j][3] = m2[j][1] - m2[j][3];
        m1[j][4] = m2[j][4] + m2[j][6];
        m1[j][5] = m2[j][5] + m2[j][7];
        m1[j][6] = m2[j][4] - m2[j][6];
        m1[j][7] = m2[j][5] - m2[j][7];
        m2[j][0] = m1[j][0] + m1[j][1];
        m2[j][1] = m1[j][0] - m1[j][1];
        m2[j][2] = m1[j][2] + m1[j][3];
        m2[j][3] = m1[j][2] - m1[j][3];
        m2[j][4] = m1[j][4] + m1[j][5];
        m2[j][5] = m1[j][4] - m1[j][5];
        m2[j][6] = m1[j][6] + m1[j][7];
        m2[j][7] = m1[j][6] - m1[j][7];
    }
//vertical
    for (i=0; i < 8; i++)
    {
        m3[0][i] = m2[0][i] + m2[4][i];
        m3[1][i] = m2[1][i] + m2[5][i];
        m3[2][i] = m2[2][i] + m2[6][i];
        m3[3][i] = m2[3][i] + m2[7][i];
        m3[4][i] = m2[0][i] - m2[4][i];
        m3[5][i] = m2[1][i] - m2[5][i];
        m3[6][i] = m2[2][i] - m2[6][i];
        m3[7][i] = m2[3][i] - m2[7][i];
        m1[0][i] = m3[0][i] + m3[2][i];
        m1[1][i] = m3[1][i] + m3[3][i];
        m1[2][i] = m3[0][i] - m3[2][i];
        m1[3][i] = m3[1][i] - m3[3][i];
        m1[4][i] = m3[4][i] + m3[6][i];
        m1[5][i] = m3[5][i] + m3[7][i];
        m1[6][i] = m3[4][i] - m3[6][i];
        m1[7][i] = m3[5][i] - m3[7][i];
        m2[0][i] = m1[0][i] + m1[1][i];
        m2[1][i] = m1[0][i] - m1[1][i];
        m2[2][i] = m1[2][i] + m1[3][i];
        m2[3][i] = m1[2][i] - m1[3][i];
        m2[4][i] = m1[4][i] + m1[5][i];
        m2[5][i] = m1[4][i] - m1[5][i];
        m2[6][i] = m1[6][i] + m1[7][i];
        m2[7][i] = m1[6][i] - m1[7][i];
    }
    for (j=0; j < 8; j++)
    {
        for (i=0; i < 8; i++)
            sad += (abs(m2[j][i]));
    }
    sad=((sad+2)>>2);
    return sad;
}
```

What is claimed is:

1. A system comprising:
   a hardware accelerator to:
      receive video data of multiple video frames;
      divide each of the video frames into respective blocks;
      compute encoding assist data including at least one video encoding parameter type for each of the respective blocks of each of the video frames; and
      store respective portions of the encoding assist data across respective block-size-specific database tables such that one block-size-specific database table is to store contiguously the encoding assist data of first size blocks, and another block-size-specific database table is to store contiguously encoding assist data of second size blocks, the first size blocks being a different size to the second size blocks; and
   an interface to provide the respective database tables to video encoding software running on a processor, wherein the processor is to:
      load the one block-size-specific database table storing the encoding assist data of the first size blocks into memory and perform a first part of an encoding process responsively to the encoding assist data of the first size blocks;
      load the other block-size-specific database table storing the encoding assist data of the second size blocks into memory and perform a second part of the encoding process responsively to the encoding assist data of the second size blocks; and compress the video data into encoded video frames responsively to the encoding assist data included in the respective block-size-specific database tables.

2. The system according to claim 1, wherein the at least one video encoding parameter type includes any one or more of the following: a motion vector; a measure of block matching; a motion vector cost; a rate distortion optimization score; an intra prediction cost; an intra prediction direction; a block distance metric; or a weighted cost score.

3. The system according to claim 1, wherein the hardware accelerator is configured to store the respective portions of the encoding assist data across the respective database tables responsively to respective video encoding parameter types.

4. The system according to claim 1, wherein the hardware accelerator is configured to store the respective portions of the encoding assist data across the respective database tables responsively to respective block sizes.

5. The system according to claim 1, wherein the hardware accelerator is configured to store the respective portions of the encoding assist data across the respective database tables responsively to respective video encoding parameter types and respective block sizes.

6. The system according to claim 1, wherein the hardware accelerator is configured to:
scan the video frames responsively to a recursive z-shaped scan pattern; and
store the encoding assist data ordered in the respective database tables responsively to the recursive z-shaped scan pattern.

7. The system according to claim 6, wherein the recursive z-shaped scan pattern is a nested z-shaped scan pattern.

8. The system according to claim 1, wherein:
the first table includes respective video encoding parameters of a first video encoding parameter type for selected blocks of the respective blocks of at least one of the video frames; and
the second table includes respective video encoding parameters of a second video encoding parameter type, different to the first video encoding parameter type, for the selected blocks.

9. The system according to claim 8, wherein:
the first video encoding parameter type of the first table is a motion vector; and
the first part of the encoding process includes performing rate control responsively to motion vectors in the first table.

10. The system according to claim 8, wherein:
the second video encoding parameter type of the second table is a measure of block matching; and
the second part of the encoding process includes identifying a scene cut responsively to measures of block matching in the second table.

11. The system according to claim 1, wherein:
the encoding software is configured to load a third table of the respective database tables into memory and perform a third part of an encoding process responsively to data of the loaded third table;
the encoding software is configured to load a fourth table of the respective database tables into memory and perform a fourth part of the encoding process responsively to data of the loaded fourth table;
the first table includes respective video encoding parameters of a first video encoding parameter type for first selected blocks of the respective blocks of at least one of the video frames of a first block size;
the second table includes respective video encoding parameters of a second video encoding parameter type, different to the first video encoding parameter type, for the first selected blocks of the first block size;
the third table includes respective video encoding parameters of the first video encoding parameter type for second selected blocks of the respective blocks of the at least one of the video frames of a second block size, different to the first block size; and
the fourth table includes respective video encoding parameters of the second video encoding parameter type for the second selected blocks of the second block size.

12. The system according to claim 1, wherein:
the first table includes first selected blocks of the respective blocks of at least one of the video frames of a first block size; and
the second table includes second selected blocks of the respective blocks of the at least one of the video frames of a second block size, different to the first block size.

13. The system according to claim 12, wherein:
the first block size is larger than the second block size; and
the encoding software is configured to:
load the first table and analyze data of the first selected blocks of the first block size; and then
load the second table and analyze data of the second selected blocks of the second block size.

14. A method comprising:
receiving video data of multiple video frames;
dividing each of the video frames into respective blocks;
computing encoding assist data including at least one video encoding parameter type for each of the respective blocks of each of the video frames;
storing respective portions of the encoding assist data across respective block-size-specific database tables such that one blocks-size specific database table stores contiguously the encoding assist data for first size blocks, and another block-size-specific database table stores contiguously encoding assist data for second size blocks, the first size blocks being a different size to the second size blocks;
providing the respective database tables to video encoding software;
loading the one block-size-specific database table storing the encoding assist data of the first size blocks into memory and perform a first part of an encoding process responsively to the encoding assist data of the first size blocks;
loading the other block-size-specific database table storing the encoding assist data of the second size blocks into memory and perform a second part of the encoding process responsively to the encoding assist data of the second size blocks; and
compressing the video data into encoded video frames responsively to the encoding assist data included in the respective block-size-specific database tables.

15. The method according to claim 14, wherein the at least one video encoding parameter type is selected from any one or more of the following: a motion vector; a rate distortion optimization score; an intra prediction cost; an intra prediction direction; a block distance metric; or a weighted cost score.

16. The method according to claim 14, wherein the storing includes storing the respective portions of the encoding assist data across the respective database tables responsively to respective video encoding parameter types.

17. The method according to claim 14, wherein the storing includes storing the respective portions of the encoding assist data across the respective database tables responsively to respective block sizes.

18. The method according to claim 14, wherein the storing includes storing the respective portions of the encoding assist data across the respective database tables responsively to respective video encoding parameter types and respective block sizes.

19. The method according to claim 14, wherein:
the first table includes respective video encoding parameters of a first video encoding parameter type for selected blocks of the respective blocks of at least one of the video frames; and
the second table includes respective video encoding parameters of a second video encoding parameter type, different to the first video encoding parameter type, for the selected blocks.

20. The method according to claim 14, further comprising:
loading a third table of the respective database tables into memory and performing a third part of an encoding process responsively to data of the loaded third table; and
loading a fourth table of the respective database tables into memory and performing a fourth part of the encoding process responsively to data of the loaded fourth table, and wherein:
the first table includes respective video encoding parameters of a first video encoding parameter type for first selected blocks of the respective blocks of at least one of the video frames of a first block size;
the second table includes respective video encoding parameters of a second video encoding parameter type, different to the first video encoding parameter type, for the first selected blocks of the first block size;
the third table includes respective video encoding parameters of the first video encoding parameter type for second selected blocks of the respective blocks of the at least one of the video frames of a second block size, different to the first block size; and
the fourth table includes respective video encoding parameters of the second video encoding parameter type for the second selected blocks of the second block size.

21. The method according to claim 14, wherein:
the first table includes first selected blocks of the respective blocks of at least one of the video frames of a first block size; and
the second table includes second selected blocks of the respective blocks of the at least one of the video frames of a second block size, different to the first block size.

22. The method according to claim 21, wherein the first block size is larger than the second block size, the method further comprising:
loading the first table and analyzing data of the first selected blocks of the first block size; and then
loading the second table and analyzing data of the second selected blocks of the second block size.

23. The method according to claim 14, further comprising:
scanning the video frames responsively to a recursive z-shaped scan pattern; and
storing the encoding assist data ordered in the respective database tables responsively to the recursive z-shaped scan pattern.

24. The method according to claim 23, wherein the recursive z-shaped scan pattern is a nested z-shaped scan pattern.

25. A system comprising:
a hardware accelerator to:
receive video data of multiple video frames;
divide each of the video frames into respective blocks;
compute encoding assist data including at least one video encoding parameter type for each of the respective blocks of each of the video frames; and
store respective portions of the encoding assist data across respective video-encoding-parameter-type-specific database tables such that one video-encoding-parameter-type-specific database table is to store contiguously the encoding assist data of a first video encoding parameter type, and another video-encoding-parameter-type-specific database table is to store contiguously encoding assist data of a second video encoding parameter type, the first video encoding parameter type being different from the second video encoding parameter type; and
an interface to provide the respective database tables to video encoding software running on a processor, wherein the processor is to:
load the one video-encoding-parameter-type-specific database table storing the encoding assist data of the first video encoding parameter type into memory and perform a first part of an encoding process responsively to the encoding assist data of the first video encoding parameter type;
load the other video-encoding-parameter-type-specific database table storing the encoding assist data of the video encoding parameter type into memory and perform a second part of the encoding process responsively to the encoding assist data of the video encoding parameter type; and
compress the video data into encoded video frames responsively to the encoding assist data included in the respective video-encoding-parameter-type-specific database tables.

* * * * *